US008722226B2

(12) United States Patent
Chiang et al.

(10) Patent No.: US 8,722,226 B2
(45) Date of Patent: May 13, 2014

(54) HIGH ENERGY DENSITY REDOX FLOW DEVICE

(75) Inventors: Yet-Ming Chiang, Weston, MA (US); William Craig Carter, Jamaica Plain, MA (US); Mihai Duduta, Cambridge, MA (US); Pimpa Limthongkul, Cambridge, MA (US)

(73) Assignee: 24M Technologies, Inc., Cambridge, MA (US)

( * ) Notice: Subject to any disclaimer, the term of this patent is extended or adjusted under 35 U.S.C. 154(b) by 503 days.

(21) Appl. No.: 12/970,773

(22) Filed: Dec. 16, 2010

(65) Prior Publication Data

US 2011/0189520 A1 Aug. 4, 2011

Related U.S. Application Data

(63) Continuation-in-part of application No. 12/484,113, filed on Jun. 12, 2009, now abandoned.

(60) Provisional application No. 61/060,972, filed on Jun. 12, 2008, provisional application No. 61/175,741, filed on May 5, 2009.

(51) Int. Cl.
*H01M 4/36* (2006.01)
*H01M 6/30* (2006.01)
*H01M 2/38* (2006.01)

(52) U.S. Cl.
USPC .............................. 429/105; 429/101; 429/81

(58) Field of Classification Search
USPC ........................................... 429/105, 101, 81
See application file for complete search history.

(56) References Cited

U.S. PATENT DOCUMENTS 4,126,733 A 11/1978 Doniat
4,159,366 A 6/1979 Thaller
4,431,718 A 2/1984 Bernard et al.
4,485,154 A 11/1984 Remick et al.

(Continued)

FOREIGN PATENT DOCUMENTS

CN 1209219 C 2/1999
CN 101213700 A 7/2008

(Continued)

OTHER PUBLICATIONS

Amatucci, et al., "Fluoride based electrode materials for advanced energy storage devices", Journal of Fluorine Chemistry, 128:243-262, 2007, 20 pages.

(Continued)

*Primary Examiner* — Helen O Conley
(74) *Attorney, Agent, or Firm* — Wilmer Cutler Pickering Hale and Dorr LLP

(57) ABSTRACT

Redox flow devices are described including a positive electrode current collector, a negative electrode current collector, and an ion-permeable membrane separating said positive and negative current collectors, positioned and arranged to define a positive electroactive zone and a negative electroactive zone; wherein at least one of said positive and negative electroactive zone comprises a flowable semi-solid composition comprising ion storage compound particles capable of taking up or releasing said ions during operation of the cell, and wherein the ion storage compound particles have a polydisperse size distribution in which the finest particles present in at least 5 vol % of the total volume, is at least a factor of 5 smaller than the largest particles present in at least 5 vol % of the total volume.

30 Claims, 9 Drawing Sheets

(56) References Cited

U.S. PATENT DOCUMENTS

| | | | | |
|---|---|---|---|---|
| 4,517,258 | A | | 5/1985 | Bronoel |
| 4,576,878 | A | | 3/1986 | Gahn |
| 4,614,693 | A | * | 9/1986 | Hashimoto et al. ............ 429/72 |
| 4,784,924 | A | * | 11/1988 | Savinell et al. .............. 429/109 |
| 4,956,244 | A | | 9/1990 | Shimizu et al. |
| 5,079,104 | A | | 1/1992 | Roche et al. |
| 5,368,952 | A | | 11/1994 | Sonneveld |
| 5,441,820 | A | | 8/1995 | Siu et al. |
| 5,558,961 | A | | 9/1996 | Doeff et al. |
| 5,792,576 | A | | 8/1998 | Sing |
| 5,837,397 | A | | 11/1998 | Xing |
| 5,849,427 | A | | 12/1998 | Siu |
| 5,869,200 | A | | 2/1999 | Nunnally |
| 5,912,088 | A | | 6/1999 | Ernst |
| 6,277,520 | B1 | | 8/2001 | Moutsios |
| 6,296,958 | B1 | | 10/2001 | Pinto et al. |
| 6,497,973 | B1 | | 12/2002 | Amendola |
| 6,551,745 | B2 | | 4/2003 | Moutsios |
| 6,689,507 | B1 | | 2/2004 | Tsutsumi |
| 6,979,512 | B2 | | 12/2005 | Phillips |
| 7,338,734 | B2 | | 3/2008 | Chiang et al. |
| 8,097,364 | B2 | | 1/2012 | Reynolds |
| 8,133,629 | B2 | | 3/2012 | McLean et al. |
| 2003/0022059 | A1 | | 1/2003 | Ito et al. |
| 2003/0143456 | A1 | | 7/2003 | Kazacos et al. |
| 2003/0211377 | A1 | | 11/2003 | Holmes et al. |
| 2005/0175890 | A1 | | 8/2005 | Tsutsumi et al. |
| 2008/0292964 | A1 | | 11/2008 | Kazacos et al. |
| 2009/0017379 | A1 | | 1/2009 | Inatomi et al. |
| 2009/0253025 | A1 | | 10/2009 | Whitacre |
| 2010/0047671 | A1 | | 2/2010 | Chiang et al. |
| 2010/0323264 | A1 | | 12/2010 | Chiang et al. |
| 2011/0274948 | A1 | | 11/2011 | Duduta et al. |
| 2012/0164499 | A1 | | 6/2012 | Chiang et al. |

FOREIGN PATENT DOCUMENTS

| | | | |
|---|---|---|---|
| EP | 330290 | A1 | 8/1989 |
| GB | 2346006 | A | 7/2000 |
| GB | 2374722 | A | 10/2002 |
| WO | WO-97/24774 | A1 | 7/1997 |
| WO | WO-99/65100 | A1 | 12/1999 |
| WO | WO-2006/135958 | A1 | 12/2006 |
| WO | WO-2008/128341 | A1 | 10/2008 |
| WO | WO-2008148148 | A1 | 12/2008 |
| WO | WO-2009/151639 | A1 | 12/2009 |
| WO | WO-2011/084649 | A2 | 7/2011 |
| WO | WO-2011/127384 | A1 | 10/2011 |
| WO | WO-2012/024499 | A1 | 2/2012 |

OTHER PUBLICATIONS

Armand, M. et al., "Conjugated dicarboxylate anodes for Li-ion batteries", Nature Materials, 8:120-125, Jan. 2009, 6 pages.

Asgeirsson "Zinc Bromine Flow Battery at Detroit Edison Utility Application", DTE Energy, California Energy Commission Workshop, Feb. 24, 2005, 35 pages.

Badway, "Carbon Metal Fluoride Nanocomposites" *J. Electrochem. Soc.*, 150(9):A1209-A1218, 2003, 11 pages.

Badway, "Carbon Metal Fluoride Nanocomposites: High-Capacity Reversible Metal Fluoride Conversion Materials as Rechargeable Positive Electrodes for Li Batteries" *J. Electrochem. Soc.*, 150(10):A1318-A1327, 2003, 11 pages.

Badway, et al. "Structure and Electrochemistry of Copper Fluoride Nanocomposites Utilizing Mixed Conducting Matrices" Chem. Mater., 19: 4129-4141, 2007, 13 pages.

Bae, et al. "Chromium redox couples for application to redox flow batteries" *Electrochimica Acta* 48:279-287, 2002, 9 pages.

Bartolozzi, "Development of Redox Flow Batteries. A Historical Bibliography", *Journal of Power Sources*, 27:219-234, 1989, 16 pages.

Bazylak, et al. "Improved fuel utilization in microfluidic fuel cells a computational study", *Journal of Power Sources* 143:57-66, 2005, 10 pages.

Bervas, et al. "Bismuth Fluoride Nanocomposite as a Positive Electrode Material for Rechargeable Lithium Batteries" *Electrochem. Solid-State Lett.* 8(4):A179-A183, 2005, 6 pages.

Bervas, et al. "Investigation of the Lithiation and Delithiation Conversion Mechanisms of Bismuth Fluoride Nanocomposites" *J. Electrochemical Society*, 153(4):A799-A808, 2006, 10 pages.

Bervas,et al., "Reversible Conversion Reactions with Lithium in Bismuth Oxyfluoride Nanocomposites", J. Electrochem. Soc., 153(1):A159-A170, 2006, 12 page.

Chakrabarti, et al.., "Evaluation of electrolytes for redox flow battery applications," Electrochemica Acta, 52:2189-2195, 2007, 7 pages.

Chan, et al. "High-performance lithium battery anodes using silicon nanowires" Nature Nanotechnology, 3:31-35, Jan. 2008, 5 pages.

Chen, et al. "Solution Redox Couples for Electrochemical Energy Storage" *J. Electrochem. Soc.*, 128(7):1460-1467, 1981, 9 pages.

Cosandey, et al. "EELS Spectroscopy of Iron Fluorides and FeFx/C Nanocomposite Electrodes Used in Li-Ion Batteries", Microscopy and Microanalysis, 13(02):87-95, 2007, 10 pages.

Davidson "New Battery Packs Powerful Punch", USA Today, Jul. 4, 2007, 3 pages.

DeBoer, et al., "Briefing Paper: Flow Batteries", Leonardo Energy, Jun. 2007, 9 pages.

No Author Listed,DTI, "Regenesys Utility Scale Energy Storage: Project Summary", Contract No. K/EL/00246/00/00, 2004, 20 pages.

Duduta, et al. "Semi-Solid Lithium Rechargeable Flow Battery" *Adv. Energy Mater.*, 1:511-516, 2011, 6 pages.

Endo, et. al., "Electrochemistry of tris(β-diketonato)ruthenium(III) complexes at platinum electrodes in nonaqueous solutions and substituent effects on their reversible half-wave potentials," Bulletin of the Chemical Society of Japan, 62(3):709-716, Mar. 1989, 10 pages.

No Author Listed, EscoVale Consultancy Services, "Flow/Redox Batteries: Technologies, Applications and Markets", Report 5061, Leaflet and Table of Contents, No Date Given, 8 pages.

Garrard, et al., "Numerical model of a single phase, regenerative fuel cell", Fuel Cell Science, Engineering and Technology Conference Proceeding, Jun. 14-16, 2004, Rochester NY, pp. 79-84, 8 pages.

Giridharan, et al., "Computational simulation of microfluidics, electrokinetics, and particle transport in biological MEMS devices", In Proceedings of SPIE, 3680:150-160, Mar.-Apr. 1999, 11 pages.

Hong, et al. "A novel in-plane passive microfluidic mixer with modified Tesla structures" *The Royal Society of Chemistry* Lab Chip, 4:109-113, 2004, 5 pages.

International Search Report and Written Opinion for PCT/US2009/003551, dated Sep. 21, 2009, 16 pages.

International Search Report and Written Opinion for PCT/US2010/60876, dated May 23, 2011, 9 pages.

International Search Report and Written Opinion for PCT/US2011/031748, dated Aug. 24, 2011, 8 pages.

International Search Report and Written Opinion for PCT/US2011/048266, dated Nov. 23, 2011, 11 pages.

Johnson, et al., "Characterization and optimization of slanted well designs for microfluidic mixing under electroosmotic flow", Lab on a Chip, 2(3):135-140, 2002, 6 pages.

Jossen et al., "Advances in Redox-Flow Batteries", First International Renewable Energy Storage Conference,Gelsenkirchen, Germnay, Oct. 30-31, 2006, 23 pages.

Koo, J., et al., "Liquid flow in microchannels: experimental observations and computational analyses of microfluidics effects", Journal of Micromechanics and Microengineering, 13(5):568-579, Sep. 2003, 14 pages.

Kumar, et al., "Effect of channel dimensions and shape in the flow-field distributor on the performance of polymer electrolyte membrane fuel cells", *Journal of Power Sources*, 113:11-18, 2003, 8 pages.

Kuntz "Flow Battery Storage Application with Wind Power", VRB Power Systems, California Energy Commission Workshop, Feb. 24, 2005, 15 pages.

Lee, et al. "Fabricating Genetically Engineered High-Power Lithium-Ion Batteries Using Multiple Virus Genes", *Science* 324:1051-1055, May 2009, 6 pages.

(56) References Cited

OTHER PUBLICATIONS

Li et al. "Li-Storage via Heterogeneous Reaction in Selected Binary Metal Fluorides and Oxides", *J. Electrochem. Soc.*, 151(11):A1878-A1885, 2004, 9 pages.
Li, et al., "Rechargeable Lithium Batteries with Aqueous Electrolytes", Science, 264:1115-1118, May 1994, 4 pages.
No Author Listed, Litihium, US Geological Survey Mineral Commodity Summaries, Jan. 2010, 1 page.
No Author Listed, Media Release ZBB Energy Corporation, "ZBB Energy Aims for Sales of up to US$38m in Zinc Bromine Batteries from New Chinese Joint Venture", Mar. 30, 2005, 2 pages.
Molenda, et al., "Modification in the electronic structure of cobalt bronze LixCoO2 and the resulting electrochemical properties," Solid State Ionics, 36:53-58, 1989 (no month given), 6 pages.
Morikawa, et al., "Development and Advances of a V-Flow FC Stack for FCX Clarity," SAE International, Paper 2009-01-1010, SAE Int. J. Engines, 2(1):955-959, 2009, 7 pages.
Nakahara, et al. "Rechargeable batteries with organic radical cathodes", *Chemical Physics Letters* 359:351-354, Jun. 2002, 4 pages.
Nam et al. "Virus-enabled synthesis and assembly of nanowires for lithium ion battery electrodes" *Science*, 312:885-888, May 2006, 5 pages.
No Author Listed, News Release VRB Power Systems, "USF and Progress Energy Florida Purchase Two 5kW x 4hr VRB Energy Storage Systems", Jul. 25, 2007, 2 pages.
Nishide, et al., "Organic radical battery: nitroxide polymers as a cathode-active material", *Electrochimica Acta* 50, 50:827-831, 2004, 5 pages.
Officer "Better Rechargeable Batteries", Anzode (NZ Ltd), No Date Given, 13 pages.
Peek "Evaluation of Utility Scale System", TVA Regenesys Flow Battery Demonstration, Sandia National Laboratories, Oct. 30, 2003, 18 pages.
Pereira, et al. "Iron Oxyfluorides as High Capacity Cathode Materials for Lithium Batteries" *J. Electrochem. Soc.*, 156(6):A407-A416, 2009, 11 pages.
Plitz, et al. "Structure and Electrochemistry of Carbon-Metal Fluoride Nanocomposites Fabricated by Solid-State Redox Conversion Reaction" *J. Electrochem. Soc.*, 152(2):A307-A315, 2005, 10 pages.
No Author Listed, Plurion Advantages Webpage as of Jun. 23, 2010, Wayback Machine Web Archive, Access date Jun. 15, 2012, 2 pages.
No Author Listed, Plurion Advantages Webpage as of May 14, 2008, Wayback Machine Web Archive, Access date Jun. 15, 2012, 2 pages.
Ponce De Leon, et al. "Redox Flow Cells for Energy Conversion", *Journal of Power Sources*, 160:716-732, 2006, 17 pages.
Price, et al., "The Regenesys Utility-Scale Flow Battery Technology: Flow Battery Technologies for Electrical Energy Storage," VDI Berichte, 1734:47-56, 2002, 15 pages.
Ruffo, et al. "Electrochemical behavior of LiCoO2 as aqueous lithium-ion battery electrodes", *Electrochemistry Communications*, 11:247-249, 2009, 3 pages.
Rydh "Energy Analysis of Batteries in Photovoltaic Systems", EESAT 2003, San Francisco, Oct. 27-29, 2003, 6 pages.
Rydh et al., "Energy Analysis of Batteries in Photovoltaic Systems. Part I: Performance and Energy Requirements", Energy Conversion and Management, 46:1957-1979, 2005, 23 pages.
Rydh et al., "Energy Analysis of Batteries in Photovoltaic Systems. Part II: Energy Return Factors and Overall Battery Efficiencies", Energy Conversion and Management, 46:1980-2000, 2005, 21 pages.
Skyllas-Kazacos, et al., "Efficient Vanadium Redox Flow Cell", *J. Electrochem. Soc.* vol., 134(12):2950-2953, Dec. 1987, 5 pages.
Thomas "Persistence and Progress: The Zinc Bromine Battery", ZBB Energy Corporation, No Date Given, 27 pages.
Walsh, "Electrochemical technology for environmental treatment and clean energy conversion", *Pure Appl. Chem.*, 73(12):1819-1837, 2001, 19 pages.
Wang, et al., "Optimizing layout of obstacles for enhanced mixing in microchannels", Smart Materials and Structures, 11:662-667, 2002, 7 pages.
Wen, et al. "A study of the Fe(III)/Fe(II)-triethanolamine complex redox couple for redox flow battery application", *Electrochimica Acta*, 51:3769-3775, 2006, 7 pages.
Yamamura, T., et. al., "Enhancements in the electron-transfer kinetics of uranium-based redox couples induced by tetraketone ligands with potential chelate effect," Journal of Physical Chemistry, 111:18812-18820, 2007, 9 pages.
No Author Listed, ZBB Energy Corporation, "The ZBB is the Best Battery for Renewable Energy Storage!", No Date Given, 42 pages.
No Author Listed, "Basic Principle of the Vanadium Fuel Cell", Cellennium (Thailand) Company Limited, www.vanadiumbattery.com/technology/technology.asp (1of2)Apr. 12, 2009, 2 pages.
No Author Listed, Department of Energy Tutorial: II, "Energy Storage Technology Overview", No Date Given, 61 pages.
No Author Listed, "Flow Cell Battery Recharges Power Grid", Advanced Battery Technology, Apr. 2003, http://findarticles.com/p/articies/mi_qa3864/is_200304/ai_n9167647/(4 of 5)Apr. 12, 2009, 4 pages.
No Author Listed, "High System-Power Density Flow Battery for Advanced Modular, Energy Storage Technology", Navy SBIR FY2009.1, Proposal No. N091-053-0414, www.navysbir.com/09-1/179.htm (1 of 2)Apr. 12, 2009 2 pages.
Amatucci, "Battery Materials and Issues for Grid Applications", Stanford University Global Climate & Energy Project, Nov. 2, 2007, 33 pages.
Katz, et al., "Chapter 21: Biochemical Fuel Cells", Handbook of Fuel Cells—Fundamentals, Technology and Applications, John Wiley & Sons, Ltd., 2003, 27 pages.
Medeiros, et al., "Magnesium-solution phase catholyte semi-fuel cell for undersea vehicles", Journal of Power Sources, 136(2):226-231, Oct. 2004, 3 pages—Abstract Only.
Miley, et al., "Optimization of the H2O2—NaBH4 Regenerative Fuel Cell for Space Power Applications Using FEMLAB Modeling", Proceedings of the COMSOL Multiphysics User's Conference, Boston, 2005, 6 pages.
Pillai, et al., "Studies on Promising Cell Performance with H2SO4 as the Catholye for Electrogeneration of Ag2+ from Ag2+ in HNO3 Anolyte in Mediated Electrochemical Oxidation Process", J. Appl. Electrochem., 39:23-30, 2009, 8 pages.
Thaller, "Redox Flow Batteries . . . Then and Now", Cleantech Energy Storage Blog, Deeya Energy, Sep. 4, 2008, 4 pages.

* cited by examiner

HIGH ENERGY DENSITY REDOX FLOW DEVICE

RELATED APPLICATIONS

This application is a Continuation-in-Part of and claims priority under 35 USC 120 to copending U.S. patent application Ser. No. 12/484,113, entitled "High Energy Density Redox Flow Device," filed Jun. 12, 2009, which claims priority under 35 U.S.C. §119(e) to U.S. Provisional Patent Application Ser. No. 61/060,972, entitled "High Energy Density Redox Flow Battery," filed Jun. 12, 2008 and U.S. Provisional Patent Application Ser. No. 61/175,741, filed May 5, 2009, entitled "High Energy Density Redox Flow Battery." Each of these applications is incorporated herein by reference in its entirety for all purposes.

STATEMENT REGARDING FEDERALLY SPONSORED RESEARCH OR DEVELOPMENT

This invention was made with government support under Grant Number DE-FC26-05NT42403 awarded by the Department of Energy. The government has certain rights in this invention.

INCORPORATION BY REFERENCE

All patents, patent applications and documents cited herein are hereby incorporated by reference in their entirety for all purposes.

BACKGROUND

A battery stores electrochemical energy by separating an ion source and an ion sink at differing ion electrochemical potential. A difference in electrochemical potential produces a voltage difference between the positive and negative electrodes; this voltage difference will produce an electric current if the electrodes are connected by a conductive element. In a battery, the negative electrode and positive electrode are connected by two conductive elements in parallel. The external element conducts electrons only, and the internal element (electrolyte) conducts ions only. Because a charge imbalance cannot be sustained between the negative electrode and positive electrode, these two flow streams supply ions and electrons at the same rate. In operation, the electronic current can be used to drive an external device. A rechargeable battery can be recharged by application of an opposing voltage difference that drives electronic current and ionic current in an opposite direction as that of a discharging battery in service. Thus, the active materials of rechargeable batteries need to be able to accept and provide ions. Increased electrochemical potentials produce larger voltage differences the cathode and anode, and increased voltage differences increase the electrochemically stored energy per unit mass of the device. For high-power devices, the ionic sources and sinks are connected to the separator by an element with large ionic conductivity, and to the current collectors with high electronic conductivity elements.

Rechargeable batteries can be constructed using static negative electrode/electrolyte and positive electrode/electrolyte media. In this case, non-energy storing elements of the device comprise a fixed volume or mass fraction of the device; thereby decreasing the device's energy and power density. The rate at which current can be extracted is also limited by the distance over which cations can be conducted. Thus, power requirements of static cells constrain the total capacity by limiting device length scales.

Redox flow batteries, also known as a flow cells or redox batteries or reversible fuel cells are energy storage devices in which the positive and negative electrode reactants are soluble metal ions in liquid solution that are oxidized or reduced during the operation of the cell. Using two reversible redox couples, liquid state redox reactions are carried out at the positive and negative electrodes. A redox flow cell typically has a power-generating assembly comprising at least an ionically transporting membrane separating the positive and negative electrode reactants (also called catholyte and anolyte respectively), and positive and negative current collectors (also called electrodes) which facilitate the transfer of electrons to the external circuit but do not participate in the redox reaction (i.e., the current collector materials themselves do not undergo Faradaic activity). Redox flow batteries have been discussed by C. Ponce de Leon, A. Frias-Ferrer, J. Gonzalez-Garcia, D. A. Szantos and F. C. Walsh, "Redox Flow Batteries for Energy Conversion," J. Power Sources, 160, 716 (2006), M. Bartolozzi, "Development of Redox Flow Batteries: A Historical Bibliography," J. Power Sources, 27, 219 (1989), and by M. Skyllas-Kazacos and F. Grossmith, "Efficient Vanadium Redox Flow Cell," Journal of the Electrochemical Society, 134, 2950 (1987).

Differences in terminology for the components of a flow battery and those of conventional primary or secondary batteries are herein noted. The electrode-active solutions in a flow battery are typically referred to as electrolytes, and specifically as the catholyte and anolyte, in contrast to the practice in lithium ion batteries where the electrolyte is solely the ion transport medium and does not undergo Faradaic activity. In a flow battery, the non-electrochemically active components at which the redox reactions take place and electrons are transported to or from the external circuit are known as electrodes, whereas in a conventional primary or secondary battery they are known as current collectors.

While redox flow batteries have many attractive features, including the fact that they can be built to almost any value of total charge capacity by increasing the size of the catholyte and anolyte reservoirs, one of their limitations is that their energy density, being in large part determined by the solubility of the metal ion redox couples in liquid solvents, is relatively low. Methods of increasing the energy density by increasing the solubility of the ions are known, and typically involve increasing the acidity of the electrode solutions. However, such measures which may be detrimental to other aspects of the cell operation, such as by increasing corrosion of cell components, storage vessels, and associated plumbing. Furthermore, the extent to which metal ion solubilities may be increased is limited.

In the field of aqueous electrolyte batteries, and specifically batteries that utilize zinc as an electroactive material, electrolytes that comprise a suspension of metal particles and in which the suspension is flowed past the membrane and current collector, have been described. See for example U.S. Pat. Nos. 4,126,733 and 5,368,952 and European Patent EP 0330290B1. The stated purpose of such electrodes is to prevent detrimental Zn metal dendrite formation, to prevent detrimental passivation of the electrodes, or to increase the amount of zincate that can be dissolved in the positive electrode as the cell discharges. However, the energy density of such fluidized bed batteries even when electrolytes with a suspension of particles are used remains relatively low.

Thus, there remains a need for high energy-density and high power-density energy storage devices.

SUMMARY

Redox flow energy storage devices are described in which at least one of the positive electrode or negative electrode-active materials may include a semi-solid or a condensed ion-storing liquid reactant, and in which at least one of the electrode-active materials may be transported to and from an assembly at which the electrochemical reaction occurs, producing electrical energy. By "semi-solid" it is meant that the material is a mixture of liquid and solid phases, for example, such as a slurry, particle suspension, colloidal suspension, emulsion, gel, or micelle. "Condensed ion-storing liquid" or "condensed liquid" means that the liquid is not merely a solvent as it is in the case of an aqueous flow cell catholyte or anolyte, but rather, that the liquid is itself redox-active. Of course, such a liquid form may also be diluted by or mixed with another, non-redox-active liquid that is a diluent or solvent, including mixing with such a diluent to form a lower-melting liquid phase, emulsion or micelles including the ion-storing liquid.

In one aspect, a redox flow energy storage device is described. The redox flow energy storage device includes:

- a positive electrode current collector, a negative electrode current collector, and an ion-permeable membrane separating the positive and negative current collectors;
- a positive electrode disposed between the positive electrode current collector and the ion-permeable membrane; the positive electrode current collector and the ion-permeable membrane defining a positive electroactive zone accommodating the positive electrode;
- a negative electrode disposed between the negative electrode current collector and the ion-permeable membrane; the negative electrode current collector and the ion-permeable membrane defining a negative electroactive zone accommodating the negative electrode;
- where at least one of the positive and negative electrode includes a flowable semi-solid or condensed liquid ion-storing redox composition which is capable of taking up or releasing the ions during operation of the cell.

In some embodiments, both of the positive and negative electrodes of the redox flow energy storage device include the flowable semi-solid or condensed liquid ion-storing redox compositions.

In some embodiments, one of the positive and negative electrodes of the redox flow energy storage device includes the flowable semi-solid or condensed liquid ion-storing redox composition, and the remaining electrode is a conventional stationary electrode.

In some embodiments, the flowable semi-solid or condensed liquid ion-storing redox composition includes a gel.

In some embodiments, the steady state shear viscosity of the flowable semi-solid or condensed liquid ion-storing redox composition of the redox flow energy storage device is between about 1 cP and about 1,500,000 cP or between about 1 cP and 1,000,000 cP at the temperature of operation of the redox flow energy storage device.

In some embodiments, the ion is selected from the group consisting of $Li^+$, $Na^+$, $H^+$.

In some embodiments, the ion is selected from the group consisting of $Li^+$, and $Na^+$, $Mg^{2+}$, $Al^{3+}$, and $Ca^{2+}$.

In some embodiments, the flowable semi-solid ion-storing redox composition includes a solid including an ion storage compound.

In some embodiments, the ion is a proton or hydroxyl ion and the ion storage compound includes those used in a nickel-cadmium or nickel metal hydride battery.

In some embodiments, the ion is lithium and the ion storage compound is selected from the group consisting of metal fluorides such as $CuF_2$, $FeF_2$, $FeF_3$, $BiF_3$, $CoF_2$, and $NiF_2$.

In some embodiments, the ion is lithium and the ion storage compound is selected from the group consisting of metal oxides such as CoO, $Co_3O_4$, NiO, CuO, and MnO.

In some embodiments, the ion is lithium and the ion storage compound includes an intercalation compound selected from compounds with the formula $Li_{1-x-z}M_{1-z}PO_4$, wherein M includes at least one first row transition metal selected from the group consisting of Ti, V, Cr, Mn, Fe, Co and Ni, wherein x is from 0 to 1 and z can be positive or negative.

In some embodiments, the ion is lithium and the ion storage compound includes an intercalation compound selected from compounds with the formula $(Li_{1-x}Z_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05.

In some embodiments, the ion is lithium and the ion storage compound includes an intercalation compound selected from compounds with the formula $LiMPO_4$, where M is one or more of V, Cr, Mn, Fe, Co, and Ni, in which the compound is optionally doped at the Li, M or O-sites.

In some embodiments, the ion is lithium and the ion storage compound includes an intercalation compound selected from the group consisting of $A_x(M'_{1-a}M''_a)_y(XD_4)_z$, $A_x(M'_{1-a}M''_a)_y(DXD_4)_z$, and $A_x(M'_{1-a}M''_a)_y(X_2D_7)_z$, wherein x, plus y(1−a) times a formal valence or valences of M', plus ya times a formal valence or valence of M'', is equal to z times a formal valence of the $XD_4$, $X_2D_7$, or $DXD_4$ group; and A is at least one of an alkali metal and hydrogen, M' is a first-row transition metal, X is at least one of phosphorus, sulfur, arsenic, molybdenum, and tungsten, M'' is any of a Group IIA, IIIA, IVA, VA, VIA, VIIA, VIIIA, IB, IIB, IIIB, IVB, VB, and VIB metal, and D is at least one of oxygen, nitrogen, carbon, or a halogen.

In some embodiments, the ion is lithium and the ion storage compound includes an intercalation compound selected from the group consisting of $(A_{1-a}M''_a)_xM'_y(XD_4)_z$, $(A_{1-z}M''_a)_x M'_y(DXD_4)_z$ and $(A_{1-a}M''_a)_xM'_y(X_2D_7)_z$, where $(1-a)_x$ plus the quantity ax times the formal valence or valences of M'' plus y times the formal valence or valences of M' is equal to z times the formal valence of the $XD_4$, $X_2D_7$ or $DXD_4$ group, and A is at least one of an alkali metal and hydrogen, M' is a first-row transition metal, X is at least one of phosphorus, sulfur, arsenic, molybdenum, and tungsten, M'' any of a Group IIA, IIIA, IVA, VA, VIA, VIIA, VIIIA, IB, IIB, IIIB, IVB, VB, and VIB metal, and D is at least one of oxygen, nitrogen, carbon, or a halogen.

In some embodiments, the ion is lithium and the ion storage compound includes an intercalation compound selected from the group consisting of ordered rocksalt compounds $LiMO_2$ including those having the $\alpha$-$NaFeO_2$ and orthorhombic-$LiMnO_2$ structure type or their derivatives of different crystal symmetry, atomic ordering, or partial substitution for the metals or oxygen, where M includes at least one first-row transition metal but may include non-transition metals including but not limited to Al, Ca, Mg, or Zr.

In some embodiments, the flowable semi-solid ion-storing redox composition includes a solid including amorphous carbon, disordered carbon, graphitic carbon, or a metal-coated or metal-decorated carbon.

In some embodiments, the flowable semi-solid ion-storing redox composition includes a solid including a metal or metal alloy or metalloid or metalloid alloy or silicon.

In some embodiments, the flowable semi-solid ion-storing redox composition includes a solid including nanostructures including nanowires, nanorods, nanotripods, and nanotetrapods.

In some embodiments, the flowable semi-solid ion-storing redox composition includes a solid including an organic redox compound.

In some embodiments, the positive electrode includes a flowable semi-solid ion-storing redox composition including a solid selected from the group consisting of ordered rocksalt compounds $LiMO_2$ including those having the $\alpha$-$NaFeO_2$ and orthorhombic-$LiMnO_2$ structure type or their derivatives of different crystal symmetry, atomic ordering, or partial substitution for the metals or oxygen, wherein M includes at least one first-row transition metal but may include non-transition metals including but not limited to Al, Ca, Mg, or Zr and the negative electrode includes a flowable semi-solid ion-storing redox composition including a solid selected from the group consisting of amorphous carbon, disordered carbon, graphitic carbon, or a metal-coated or metal-decorated carbon.

In some embodiments, the positive electrode includes a flowable semi-solid ion-storing redox composition including a solid selected from the group consisting of $A_x(M'_{1-a}M''_a)_y(XD_4)z$, $A_x(M'_{1-a}M''_a)_y(DXD_4)_z$, and $A_x(M'_{1-a}M''_a)_y(X_2D_7)_z$, and where x, plus y(1−a) times a formal valence or valences of M', plus ya times a formal valence or valence of M'', is equal to z times a formal valence of the $XD_4$, $X_2D_7$, or $DXD_4$ group, and A is at least one of an alkali metal and hydrogen, M' is a first-row transition metal, X is at least one of phosphorus, sulfur, arsenic, molybdenum, and tungsten, M'' any of a Group IIA, IIIA, IVA, VA, VIA, VIIA, VIIIA, IB, IIB, IIIB, IVB, VB, and VIB metal, D is at least one of oxygen, nitrogen, carbon, or a halogen and the negative electrode includes a flowable semi-solid ion-storing redox composition including a solid selected from the group consisting of amorphous carbon, disordered carbon, graphitic carbon, or a metal-coated or metal-decorated carbon.

In some embodiments, the positive electrode includes a flowable semi-solid ion-storing redox composition including a compound with a spinel structure.

In some embodiments, the positive electrode includes a flowable semi-solid ion-storing redox composition including a compound selected from the group consisting of $LiMn_2O_4$ and its derivatives; layered-spinel nanocomposites in which the structure includes nanoscopic regions having ordered rocksalt and spinel ordering; so-called "high voltage spinels" with a potential vs. $Li/Li^+$ that exceeds 4.3V including but not limited to $LiNi_{0.5}Mn_{1.5}O_4$; olivines $LiMPO_4$ and their derivatives, in which M includes one or more of Mn, Fe, Co, or Ni, partially fluorinated compounds such as $LiVPO_4F$, other "polyanion" compounds as described below, and vanadium oxides $V_xO_y$ including $V_2O_5$ and $V_6O_{11}$.

In some embodiments, the negative electrode includes a flowable semi-solid ion-storing redox composition including graphite, graphitic boron-carbon alloys, hard or disordered carbon, lithium titanate spinel, or a solid metal or metal alloy or metalloid or metalloid alloy that reacts with lithium to form intermetallic compounds, including the metals Sn, Bi, Zn, Ag, and Al, and the metalloids Si and Ge.

In some embodiments, in order to increase the particle packing density and therefore the energy density of the semi-solid suspension, while still maintaining a flowable semi-solid, the ion storage compound particles have a polydisperse size distribution in which the finest particles present in at least 5 vol % of the total volume, is at least a factor of 5 smaller than the largest particles present in at least 5 vol % of the total volume.

In some embodiments, in order to increase the particle packing density and therefore the energy density of the semi-solid suspension, while still maintaining a flowable semi-solid, the ion storage compound particles have a bidisperse size distribution (i.e., with two maxima in the distribution of particle number versus particle size) in which the two maxima differ in size by at least a factor of 5.

In some embodiments, the sized distribution of ion storage compound particles in the semi-solid is polydisperse, and the particle packing fraction is at least 50 vol %, preferably at least 55 vol %, more preferably at least 60 vol %, still more preferably at least 65 vol %, and still more preferably at least 70 vol %.

In some embodiments, the particles have morphology that is at least equiaxed, and preferably spherical, in order to increase the flowability and decrease the viscosity of the semi-solid suspension while simultaneously achieving high particle packing density. In some embodiments the spherical particles are dense, and in other embodiments the spherical particles are porous. In some embodiments, the spherical particles are made by spray-drying a particle suspension to obtain spherical agglomerates of smaller particles.

In some embodiments, the particles of ion storage material used in the semi-solid suspension are sufficiently large that surface forces do not prohibit them from achieving high tap density while dry, and high packing density when formulated into a semi-solid suspension. In some embodiments, the particle size is at least 1 micrometer and preferably at least 10 micrometers.

In some embodiments, high particle packing density is achieved simultaneously with flowability and low viscosity by using dispersants and surfactants well-known to those skilled in the arts of ceramics processing and colloid chemistry. These additives may be, for example, organic molecules having a $C_6$ to $C_{12}$ backbone used to provide steric forces when adsorbed on the particles. Examples of such additives include stearic acid, and the commercially available surfactant Triton-X-100.

In some embodiments, a redox mediator is used to improve charge transfer within the semi-solid suspension. In some embodiments the redox mediator is based on $Fe^{2+}$ or $V^{2+}$, $V^{3+}$, or $V^{4+}$. In one embodiment the redox mediator is ferrocene.

In one embodiment, the flow battery uses dissolved redox ions as in a conventional aqueous or nonaqueous flow battery, but the anolyte and/or catholyte has a increased solubility for such ions by using as the solvent an ionic liquid. In some embodiments, the redox chemistry is Fe—Cr, vanadium redox, or a zinc-halogen chemistry.

In some embodiments, the redox flow energy storage device further includes a storage tank for storing the flowable semi-solid or condensed liquid ion-storing redox composition, and the storage tank is in flow communication with the redox flow energy storage device.

In some embodiments, the redox flow energy storage device includes an inlet for introduction of the flowable semi-solid or condensed liquid ion-storing redox composition into the positive/negative electroactive zone and an outlet for the exit of the flowable semi-solid or condensed liquid ion-storing redox composition out of the positive/negative electroactive zone. In some specific embodiments, the redox flow energy storage device further includes a fluid transport device to enable the flow communication. In certain specific embodiments, the fluid transport device is a pump. In certain specific embodiments, the pump is a peristaltic pump.

In some embodiments, the flowable semi-solid or condensed liquid ion-storing redox composition further includes one or more additives. In certain specific embodiments, the additives include a conductive additive. In certain other embodiments, the additive includes a thickener. In yet other specific embodiments, the additive includes a compound that getters water.

In some embodiments, the flowable semi-solid ion-storing redox composition includes a ion-storing solid coated with a conductive coating material. In certain specific embodiments, the conductive coating material has higher electron conductivity than the solid. In certain specific embodiments, the solid is graphite and the conductive coating material is a metal, metal carbide, metal nitride, or carbon. In certain specific embodiments, the metal is copper.

In some embodiments, the redox flow energy storage device further includes one or more reference electrodes.

In some embodiments, the flowable semi-solid or condensed liquid ion-storing redox composition of the redox flow energy storage device provides a specific energy of more than about 150 Wh/kg at a total energy of less than about 50 kWh.

In some embodiments, the semi-solid or condensed-liquid ion-storing material of the redox flow energy storage device provides a specific energy of more than about 200 Wh/kg at total energy less than about 100 kWh, or more than about 250 Wh/kg at total energy less than about 300 kWh.

In some embodiments, the condensed-liquid ion-storing material includes a liquid metal alloy.

In some embodiments, the ion-permeable membrane includes polyethyleneoxide (PEO) polymer sheets or Nafion™ membranes.

In some embodiments, a method of operating a redox flow energy storage device is described. The method includes:

providing a redox flow energy storage device including:

a positive electrode current collector, a negative electrode current collector, and an ion-permeable membrane separating the positive and negative current collectors;

a positive electrode disposed between the positive electrode current collector and the ion-permeable membrane; the positive electrode current collector and the ion-permeable membrane defining a positive electroactive zone accommodating the positive electrode;

a negative electrode disposed between the negative electrode current collector and the ion-permeable membrane; the negative electrode current collector and the ion-permeable membrane defining a negative electroactive zone accommodating the negative electrode;

where at least one of the positive and negative electrode includes a flowable semi-solid or condensed liquid ion-storing redox composition which is capable of taking up or releasing the ions during operation of the cell;

transporting the flowable semi-solid or condensed liquid ion-storing redox composition into the electroactive zone during operation of the device.

In some embodiments, in the method of operating a redox flow energy storage device, at least a portion of the flowable semi-solid or condensed liquid ion-storing redox composition in the electroactive zone is replenished by introducing new semi-solid or condensed liquid ion-storing redox composition into the electroactive zone during operation.

In some embodiments, the method of operating a redox flow energy storage device further includes:

transporting depleted semi-solid or condensed liquid ion-storing material to a discharged composition storage receptacle for recycling or recharging.

In some embodiments, the method of operating a redox flow energy storage device further includes:

applying an opposing voltage difference to the flowable redox energy storage device; and transporting charged semi-solid or condensed liquid ion-storing redox composition out of the electroactive zone to a charged composition storage receptacle during charging.

In some embodiments, the method of operating a redox flow energy storage device further includes:

applying an opposing voltage difference to the flowable redox energy storage device; and transporting discharged semi-solid or condensed liquid ion-storing redox composition into the electroactive zone to be charged.

In some embodiments, a method of use in which a rechargeable battery is provided with a zero self-discharge rate is provided. The semi-solid flow batteries of the invention are constructed to permit valving off of the cathode and anode slurries permitting long "standby," and then "restarted" by activating flow. For example, this mode of operation provides the first rechargeable nickel metal hydride or lithium ion batteries with zero self-discharge, analogous to primary thermal batteries. Long standby without self discharge is desirable for many applications including auxiliary grid-connected or autonomous power sources, or hybrid and all-electric vehicles batteries where a vehicle may sit unused for a long period of time. Optionally, the method of use may include activating the semi-solid catholyte or anolyte prior to restarting the battery by stirring, mixing, agitation, ultrasonication, or heating.

As used herein, positive electrode and cathode are used interchangeably. As used herein, negative electrode and anode are used interchangeably.

The energy storage systems described herein can provide a high enough specific energy to permit, for example, extended driving range for an electric vehicle, or provide a substantial improvement in specific energy or energy density over conventional redox batteries for stationary energy storage, including for example applications in grid services or storage of intermittent renewable energy sources such as wind and solar power.

In another aspect, a flow cell energy storage system includes a positive electrode current collector, a negative electrode current collector, and an ion-permeable membrane separating said positive and negative current collectors, positioned and arranged to define a positive electroactive zone and a negative electroactive zone; wherein at least one of said positive and negative electroactive zone comprises a flowable semi-solid composition comprising ion storage compound particles capable of taking up or releasing said ions during operation of the cell, and wherein the ion storage compound particles have a polydisperse size distribution in which the finest particles present in at least 5 vol % of the total volume, is at least a factor of 5 smaller than the largest particles present in at least 5 vol % of the total volume.

In one or more embodiments, the finest particles present in at least 5 vol % of the total volume, is at least a factor of 7 smaller than the largest particles present in at least 5 vol % of the total volume, or the finest particles present in at least 5 vol % of the total volume, is at least a factor of 10 smaller than the largest particles present in at least 5 vol % of the total volume.

In one or more embodiments, the ion storage compound particles have a bidisperse size distribution in which the two maxima differ in size by at least a factor of 5.

In one or more embodiments, the particle packing fraction is at least 50 vol %, preferably at least 55 vol %, more preferably at least 60 vol %, still more preferably at least 65 vol %, and still more preferably at least 70 vol %.

In one or more embodiments, the particles have morphology that is at least equiaxed.

In one or more embodiments, the particle size of the maxima for the larger particles is at least 1 micrometer and preferably at least 10 micrometers.

In one or more embodiments, the system further includes a redox mediator.

In one or more embodiments, the redox mediator is soluble in the semi-solid composition and comprises multiple oxidation states.

In one or more embodiments, the redox mediator is comprises a redox metal ion selected from iron, vanadium, chromium and zinc and mixtures thereof.

In one or more embodiments, the redox mediator comprises ferrocene.

In one or more embodiments, the semi-solid ion-storing redox composition further comprises an electrically conductive additive.

In one or more embodiments, the electronically conductive material comprises a conductive inorganic compound.

In one or more embodiments, the electronically conductive material is selected from the group consisting of metals, metal carbides, metal nitrides, metal oxides, and allotropes of carbon including carbon black, graphitic carbon, carbon fibers, carbon microfibers, vapor-grown carbon fibers (VGCF), fullerenic carbons including "buckyballs", carbon nanotubes (CNTs), multiwall carbon nanotubes (MWNTs), single wall carbon nanotubes (SWNTs), graphene sheets or aggregates of graphene sheets, and materials comprising fullerenic fragments and mixtures thereof.

In one or more embodiments, the electronically conductive material comprises an electronically conductive polymer.

In one or more embodiments, the electronically conductive material is selected from the group consisting of polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocence-substituted polyethylene, carbazole-substituted polyethylene, polyoxyphenazine, polyacenes, or poly(heteroacenes) and mixtures thereof.

In one or more embodiments, the additive coats the ion storage compound particles In one or more embodiments, the one ore both of the positive and negative current collector is coated with an electronically conductive material.

In one or more embodiments, the conductive-coating material is selected from the group consisting of carbon, a metal, metal carbide, metal nitride, metal oxide, or conductive polymer, conductive polymers, polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocence-substituted polyethylene, carbazole-substituted polyethylene, polyoxyphenazine, polyacenes, or poly(heteroacenes) and mixtures thereof.

In one or more embodiments, the conductive polymer is a compound that reacts in-situ to form a conductive polymer on the surface of the current collector.

In one or more embodiments, the compound comprises 2-hexylthiophene and oxidizes at a high potential to form a conductive polymer coating on the current collector.

In another aspect, a flow cell energy storage system includes a positive electrode current collector, a negative electrode current collector, and an ion-permeable membrane separating said positive and negative current collectors, positioned and arranged to define a positive electroactive zone and a negative electroactive zone; wherein at least one of said positive and negative electroactive zone comprises a flowable condensed liquid composition comprising ion storage compound capable of taking up or releasing said ions during operation of the cell and an electronically conductive polymer.

In one or more embodiments, the electronically conductive material is selected from the group consisting of polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocence-substituted polyethylene, carbazole-substituted polyethylene, polyoxyphenazine, polyacenes, or poly(heteroacenes) and mixtures thereof.

In one aspect, a flow cell energy storage system includes a positive electrode current collector, a negative electrode current collector, and an ion-permeable membrane separating said positive and negative current collectors, positioned and arranged to define a positive electroactive zone and a negative electroactive zone; wherein at least one of said positive and negative electroactive zone comprises a flowable semi-solid or condensed liquid composition comprising ion storage compound capable of taking up or releasing said ions during operation of the cell, at least one storage tank external to the flow cell for holding, delivering and/or receiving the flowable semi-solid or condensed liquid composition; and a cut-off valve for reversibly isolating the storage tank from the flow cell.

In one aspect, the flow cell energy storage system a positive electrode current collector, a negative electrode current collector, and an ion-permeable membrane separating said positive and negative current collectors, positioned and arranged to define a positive electroactive zone and a negative electroactive zone; wherein at least one of said positive and negative electroactive zone comprises an aqueous redox solution capable of taking up or releasing said ions during operation of the cell and an electronically conductive additive.

In one or more embodiments, the electronically conductive material is selected from the group consisting of polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocence-substituted polyethylene, carbazole-substituted polyethylene, polyoxyphenazine, polyacenes, or poly(heteroacenes) and mixtures thereof.

In one or more embodiments, the electronically conductive material is selected from the group consisting of solid inorganic conductive materials, metals, metal carbides, metal nitrides, metal oxides, and allotropes of carbon including carbon black, graphitic carbon, carbon fibers, carbon microfibers, vapor-grown carbon fibers (VGCF), fullerenic carbons including "buckyballs", carbon nanotubes (CNTs), multiwall carbon nanotubes (MWNTs), single wall carbon nanotubes (SWNTs), graphene sheets or aggregates of graphene sheets, and materials comprising fullerenic fragments and mixtures thereof.

BRIEF DESCRIPTION OF THE DRAWINGS

The subject matter is described with reference to the drawings, which are intended to be illustrative in nature and not intended to be limiting of the invention, the full scope of which is set forth in the claims that follow.

DETAILED DESCRIPTION

Figure 1:
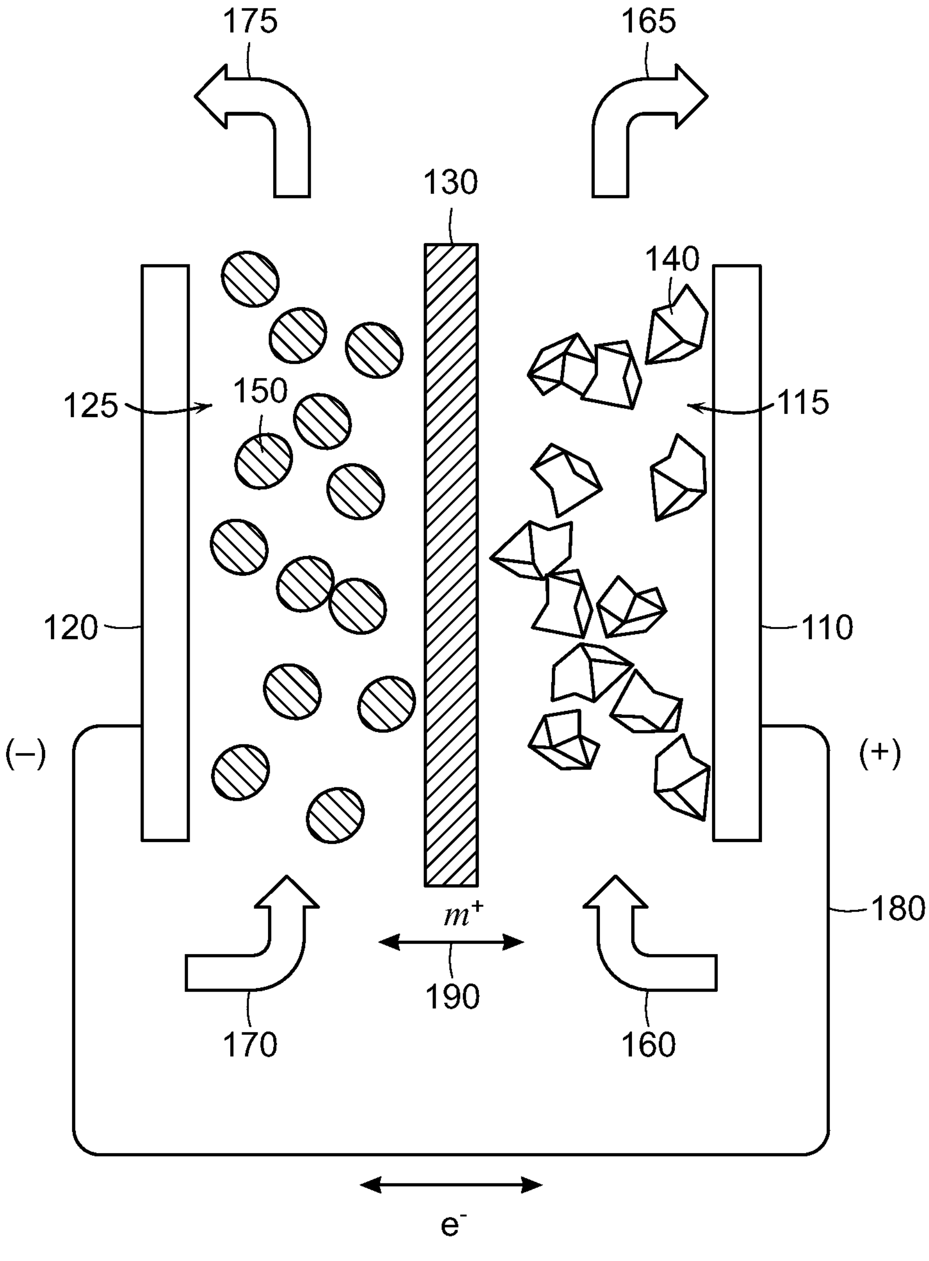
FIG. 1 is a cross-sectional illustration of the redox flow battery according to one or more embodiments.

An exemplary redox flow energy storage device 100 is illustrated in FIG. 1A. Redox flow energy storage device 100 may include a positive electrode current collector 110 and a negative electrode current collector 120, separated by an ion permeable separator 130. Current collectors 110, 120 may be in the form of a thin sheet and are spaced apart from separator 130. Positive electrode current collector 110 and ion permeable separator 130 define an area, 115, herein after referred to as the "positive electroactive zone" that accommodates the positive flowable electrode active material 140. Negative electrode current collector 120 and ion permeable separator 130 define an area, 125, herein after referred to as the "negative electroactive zone" that accommodates the negative flowable electrode active material 150. The electrode-active materials can be flowable redox compositions and can be transported to and from the electroactive zone at which the electrochemical reaction occurs. The flowable redox composition can include a semi-solid or a condensed liquid ion-storing electroactive material, and optionally a fluid for supporting or suspending the solid or condensed ion-storing liquid electrolyte. As used herein, semi-solid refers to a mixture of liquid and solid phases, such as a slurry, particle suspension, colloidal suspension, emulsion, or micelle. In some embodiments, the emulsion or micelle in a semi-solid includes a solid in at least one of the liquid-containing phases. As used herein, condensed liquid or condensed ion-storing liquid refers to a liquid that is not merely a solvent as it is in the case of an aqueous flow cell catholyte or anolyte, but rather that the liquid is itself redox-active. The liquid form can also be diluted by or mixed with another, non-redox-active liquid that is a diluent or solvent, including mixing with such a diluents to form a lower-melting liquid phase, emulsion or micelles including the ion-storing liquid.

The positive electrode flowable material 140 can enter the positive electroactive zone 115 in the direction indicated by arrow 160. Positive electrode material 140 can flow through the electroactive zone and exit at the upper location of the electroactive zone in the direction indicated by arrow 165. Similarly, the negative electrode flowable material 150 can enter the negative electroactive zone 125 in the direction indicated by arrow 170. Negative electrode material 150 can flow through the electroactive zone and exits at the upper location of the electroactive zone in the direction indicated by arrow 175. The direction of flow can be reversed, for example, when alternating between charging and discharging operations. It is noted that the illustration of the direction of flow is arbitrary in the figure. Flow can be continuous or intermittent. In some embodiments, the positive and negative redox flow materials are stored in a storage zone or tank (not shown) prior to use. In some embodiments, the flowable redox electrode materials can be continuously renewed and replaced from the storage zones, thus generating an energy storage system with very high energy capacity. In some embodiments, a transporting device is used to introduce positive and negative ion-storing electroactive materials into the positive and negative electroactive zones, respectively. In some embodiments, a transporting device is used to transport depleted positive and negative ion-storing electroactive materials out of the positive and negative electroactive zones, respectively, and into storage tanks for depleted electroactive materials for recharging. In some embodiments, the transporting device can be a pump or any other conventional device for fluid transport. In some specific embodiments, the transporting device is a peristaltic pump.

During operation, the positive and negative electroactive materials can undergo reduction and oxidation. Ions 190 can move across ion permeable membrane 130 and electrons can flow through an external circuit 180 to generate current. In a typical flow battery, the redox-active ions or ion complexes undergo oxidation or reduction when they are in close proximity to or in contact with a current collector that typically does not itself undergo redox activity. Such a current collector may be made of carbon or nonreactive metal, for example. Thus, the reaction rate of the redox active species can be determined by the rate with which the species are brought close enough to the current collector to be in electrical communication, as well as the rate of the redox reaction once it is in electrical communication with the current collector. In some instances, the transport of ions across the ionically conducting membrane may rate-limit the cell reaction. Thus the rate of charge or discharge of the flow battery, or the power to energy ratio, may be relatively low. The number of battery cells or total area of the separators or electroactive zones and composition and flow rates of the flowable redox compositions can be varied to provide sufficient power for any given application.

In some embodiments, at least one of the positive or negative flowable redox compositions includes a semi-solid or a condensed ion-storing liquid electroactive material.

During discharging operation, the difference in electrochemical potentials of the positive and negative electrode of the redox flow device can produces a voltage difference between the positive and negative electrodes; this voltage difference would produce an electric current if the electrodes were connected in a conductive circuit. In some embodiments, during discharging, a new volume of charged flowable semi-solid or condensed liquid ion-storing composition is transported from a charged composition storage tank into the electroactive zone. In some embodiments, during discharging, the discharged or depleted flowable semi-solid or condensed liquid ion-storing composition can be transported out of the electroactive zone and stored in a discharged composition storage receptacle until the end of the discharge.

During charging operation, the electrode containing flowable redox composition can be run in reverse, either electrochemically and mechanically. In some embodiments, the depleted flowable semi-solid or condensed liquid ion-storing composition can be replenished by transporting the depleted redox composition out of the electroactive zone and introducing fully charged flowable semi-solid or condensed liquid ion-storing composition into the electroactive zone. This could be accomplished by using a fluid transportation device such as a pump. In some other embodiments, an opposing voltage difference can be applied to the flowable redox energy storage device to drive electronic current and ionic current in a direction opposite to that of discharging, to reverse the electrochemical reaction of discharging, thus charging the flowable redox composition of the positive and negative electrodes. In some specific embodiments, during charging, discharged or depleted flowable semi-solid or condensed liquid ion-storing composition is mechanically transported into the electroactive zone to be charged under the opposing voltage difference applied to the electrodes. In some specific embodiments, the charged flowable semi-solid or condensed liquid ion-storing composition is transported out of the electroactive zone and stored in a charged composition storage receptacle until the end of the charge. The transportation can be accomplished by using a fluid transportation device such as a pump.

One distinction between a conventional flow battery anolyte and catholyte and the ion-storing solid or liquid phases as exemplified herein is the molar concentration or molarity of redox species in the storage compound. For example, conventional anolytes or catholytes that have redox species dissolved in aqueous solution may be limited in molarity to typically 2M to 8M concentration. Highly acidic solutions may be necessary to reach the higher end of this concentration range. By contrast, any flowable semi-solid or condensed liquid ion-storing redox composition as described herein may have, when taken in moles per liter or molarity, at least 10M concentration of redox species, preferably at least 12M, still preferably at least 15M, and still preferably at least 20M. The electrochemically active material can be an ion storage material or any other compound or ion complex that is capable of undergoing Faradaic reaction in order to store energy. The electroactive material can also be a multiphase material including the above-described redox-active solid or liquid phase mixed with a non-redox-active phase, including solid-liquid suspensions, or liquid-liquid multiphase mixtures, including micelles or emulsions having a liquid ion-storage material intimately mixed with a supporting liquid phase. In the case of both semi-solid and condensed liquid storage compounds for the flowable ion-storing redox compositions, systems that utilize various working ions are contemplated, including aqueous systems in which $H^+$ or $OH^-$ are the working ions, nonaqueous systems in which $Li^+$, $Na^+$, or other alkali ions are the working ions, even alkaline earth working ions such as $Ca^{2+}$ and $Mg^{2+}$, or $Al^{3+}$. In each of these instances, a negative electrode storage material and a positive electrode storage material may be required, the negative electrode storing the working ion of interest at a lower absolute electrical potential than the positive electrode. The cell voltage can be determined approximately by the difference in ion-storage potentials of the two ion-storage electrode materials.

Systems employing both negative and positive ion-storage materials are particularly advantageous because there are no additional electrochemical byproducts in the cell. Both the positive and negative electrodes materials are insoluble in the flow electrolyte and the electrolyte does not become contaminated with electrochemical composition products that must be removed and regenerated. In addition, systems employing both negative and positive lithium ion-storage materials are particularly advantageous when using non-aqueous electrochemical compositions.

In some embodiments, the flowable semi-solid or condensed liquid ion-storing redox compositions include materials proven to work in conventional, solid lithium-ion batteries. In some embodiments, the positive flowable electroactive materials contains lithium positive electroactive materials and the lithium cations are shuttled between the negative electrode and positive electrode, intercalating into solid, host particles suspended in a liquid electrolyte.

In some embodiments at least one of the energy storage electrodes includes a condensed ion-storing liquid of a redox-active compound, which may be organic or inorganic, and includes but is not limited to lithium metal, sodium metal, lithium-metal alloys, gallium and indium alloys with or without dissolved lithium, molten transition metal chlorides, thionyl chloride, and the like, or redox polymers and organics that are liquid under the operating conditions of the battery. Such a liquid form may also be diluted by or mixed with another, non-redox-active liquid that is a diluent or solvent, including mixing with such a diluents to form a lower-melting liquid phase. However, unlike a conventional flow cell catholyte or anolyte, the redox active component will comprise by mass at least 10% of the total mass of the flowable electrolyte, and preferably at least 25%.

In some embodiments, the redox-active electrode material, whether used as a semi-solid or a condensed liquid format as defined above, comprises an organic redox compound that stores the working ion of interest at a potential useful for either the positive or negative electrode of a battery. Such organic redox-active storage materials include "p"-doped conductive polymers such as polyaniline or polyacetylene based materials, polynitroxide or organic radical electrodes (such as those described in: H. Nishide et al., Electrochim. *Acta,* 50, 827-831, (2004), and K. Nakahara, et al., *Chem. Phys. Lett.,* 359, 351-354 (2002)), carbonyl based organics, and oxocarbons and carboxylate, including compounds such as $Li_2C_6O_6$, $Li_2C_8H_4O_4$, and $Li_2C_6H_4O_4$ (see for example M. Armand et al., *Nature Materials*, DOI: 10.1038/nmat2372) and organosulfur compounds.

In some embodiments, organic redox compounds that are electronically insulating are used. In some instance, the redox compounds are in a condensed liquid phase such as liquid or flowable polymers that are electronically insulating. In such cases, the redox active slurry may or may not contain an additional carrier liquid. Additives can be combined with the condensed phase liquid redox compound to increase electronic conductivity. In some embodiments, such electronically insulating organic redox compounds are rendered electrochemically active by mixing or blending with particulates of an electronically conductive material, such as solid inorganic conductive materials including but not limited to metals, metal carbides, metal nitrides, metal oxides, and allotropes of carbon including carbon black, graphitic carbon, carbon fibers, carbon microfibers, vapor-grown carbon fibers (VGCF), fullerenic carbons including "buckyballs", carbon nanotubes (CNTs), multiwall carbon nanotubes (MWNTs), single wall carbon nanotubes (SWNTs), graphene sheets or aggregates of graphene sheets, and materials comprising fullerenic fragments.

In some embodiments, such electronically insulating organic redox compounds are rendered electronically active by mixing or blending with an electronically conductive polymer, including but not limited to polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocence-substituted polyethylene, carbazole-substituted polyethylene, polyoxyphenazine, polyacenes, or poly(heteroacenes. The conductive additives form an electrically conducting framework within the insulating liquid redox compounds that significantly increases the electrically conductivity of the composition. In some embodiments, the conductive addition forms a percolative pathway to the current collector.

In some embodiments the redox-active electrode material comprises a sol or gel, including for example metal oxide sols or gels produced by the hydrolysis of metal alkoxides, amongst other methods generally known as "sol-gel processing." Vanadium oxide gels of composition VxOy are amongst such redox-active sol-gel materials.

Other suitable positive active materials include solid compounds known to those skilled in the art as those used in NiMH (Nickel-Metal Hydride) Nickel Cadmium (NiCd) batteries. Still other positive electrode compounds for Li storage include those used in carbon monofluoride batteries, generally referred to as CFx, or metal fluoride compounds having approximate stoichiometry $MF_2$ or $MF_3$ where M comprises Fe, Bi, Ni, Co, Ti, V. Examples include those described in H. Li, P. Balaya, and J. Maier, Li-Storage via Heterogeneous Reaction in Selected Binary Metal Fluorides and Oxides, *Journal of The Electrochemical Society,* 151 [11] A1878-A1885 (2004), M. Bervas, A. N. Mansour, W.-S. Woon, J. F. Al-Sharab, F. Badway, F. Cosandey, L. C. Klein, and G. G. Amatucci, "Investigation of the Lithiation and Delithiation Conversion Mechanisms in a Bismuth Fluoride Nanocomposites", J. Electrochem. Soc., 153, A799 (2006), and I. Plitz, F. Badway, J. Al-Sharab, A. DuPasquier, F. Cosandey and G. G. Amatucci, "Structure and Electrochemistry of Carbon-Metal Fluoride Nanocomposites Fabricated by a Solid State Redox Conversion Reaction", *J. Electrochem. Soc.,* 152, A307 (2005).

As another example, fullerenic carbon including single-wall carbon nanotubes (SWNTs), multiwall carbon nanotubes (MWNTs), or metal or metalloid nanowires may be used as ion-storage materials. One example is the silicon nanowires used as a high energy density storage material in a report by C. K. Chan, H. Peng, G. Liu, K. McIlwrath, X. F. Zhang, R. A. Huggins, and Y. Cui, High-performance lithium battery anodes using silicon nanowires, *Nature Nanotechnology*, published online 16 Dec. 2007; doi:10.1038/nnano.2007.411.

Exemplary electroactive materials for the positive electrode in a lithium system include the general family of ordered rocksalt compounds $LiMO_2$ including those having the $\alpha$-$NaFeO_2$ (so-called "layered compounds") or orthorhombic-$LiMnO_2$ structure type or their derivatives of different crystal symmetry, atomic ordering, or partial substitution for the metals or oxygen. M comprises at least one first-row transition metal but may include non-transition metals including but not limited to Al, Ca, Mg, or Zr. Examples of such compounds include $LiCoO_2$, $LiCoO_2$ doped with Mg, $LiNiO_2$, Li(Ni, Co, Al)$O_2$ (known as "NCA") and Li(Ni, Mn, Co)$O_2$ (known as "NMC"). Other families of exemplary electroactive materials includes those of spinel structure, such as $LiMn_2O_4$ and its derivatives, so-called "layered-spinel nanocomposites" in which the structure includes nanoscopic regions having ordered rocksalt and spinel ordering, olivines $LiMPO_4$ and their derivatives, in which M comprises one or more of Mn, Fe, Co, or Ni, partially fluorinated compounds such as $LiVPO_4F$, other "polyanion" compounds as described below, and vanadium oxides $V_xO_y$ including $V_2O_5$ and $V_6O_{11}$.

In one or more embodiments the active material comprises a transition metal polyanion compound, for example as described in U.S. Pat. No. 7,338,734. In one or more embodiments the active material comprises an alkali metal transition metal oxide or phosphate, and for example, the compound has a composition $A_x(M'_{1-a}M''_a)_y(XD_4)_z$, $A_x(M'_{1-a}M''_a)_y(DXD_4)_z$, or $A_x(M'_{1-a}M''_a)_y(X_2D_7)_z$, and have values such that x, plus y(1−a) times a formal valence or valences of M', plus ya times a formal valence or valence of M", is equal to z times a formal valence of the $XD_4$, $X_2D_7$, or $DXD_4$ group; or a compound comprising a composition $(A_{1-a}M''_a)_xM'_y(XD_4)_z$, $(A_{1-a}M''_a)_xM'_y(DXD_4)_z(A_{1-a}M''_a)_xM'_y(X_2D_7)_z$ and have values such that $(1-a)_x$ plus the quantity ax times the formal valence or valences of M" plus y times the formal valence or valences of M' is equal to z times the formal valence of the $XD_4$, $X_2D_7$ or $DXD_4$ group. In the compound, A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen. The positive electroactive material can be an olivine structure compound $LiMPO_4$, where M is one or more of V, Cr, Mn, Fe, Co, and Ni, in which the compound is optionally doped at the Li, M or O-sites. Deficiencies at the Li-site are compensated by the addition of a metal or metalloid, and deficiencies at the O-site are compensated by the addition of a halogen. In some embodiments, the positive active material comprises a thermally stable, transition-metal-doped lithium transition metal phosphate having the olivine structure and having the formula $(Li_{1-x}Z_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05.

In other embodiments, the lithium transition metal phosphate material has an overall composition of $Li_{1-x-z}M_{1+z}PO_4$, where M comprises at least one first row transition metal selected from the group consisting of Ti, V, Cr, Mn, Fe, Co and Ni, where x is from 0 to 1 and z can be positive or negative. M includes Fe, z is between about 0.15 and −0.15. The material can exhibit a solid solution over a composition range of $0<x<0.15$, or the material can exhibit a stable solid solution over a composition range of x between 0 and at least about 0.05, or the material can exhibit a stable solid solution over a composition range of x between 0 and at least about 0.07 at room temperature (22-25° C.). The material may also exhibit a solid solution in the lithium-poor regime, e.g., where $x\geq 0.8$, or $x\geq 0.9$, or $x\geq 0.95$.

In some embodiments the redox-active electrode material comprises a metal salt that stores an alkali ion by undergoing a displacement or conversion reaction. Examples of such compounds include metal oxides such as CoO, $CO_3O_4$, NiO, CuO, MnO, typically used as a negative electrode in a lithium battery, which upon reaction with Li undergo a displacement or conversion reaction to form a mixture of $Li_2O$ and the metal constituent in the form of a more reduced oxide or the metallic form. Other examples include metal fluorides such as $CuF_2$, $FeF_2$, $FeF_3$, $BiF_3$, $CoF_2$, and $NiF_2$, which undergo a displacement or conversion reaction to form LiF and the reduced metal constituent. Such fluorides may be used as the positive electrode in a lithium battery. In other embodiments the redox-active electrode material comprises carbon monofluoride or its derivatives. In some embodiments the material undergoing displacement or conversion reaction is in the form of particulates having on average dimensions of 100 nanometers or less. In some embodiments the material undergoing displacement or conversion reaction comprises a nanocomposite of the active material mixed with an inactive host, including but not limited to conductive and relatively ductile compounds such as carbon, or a metal, or a metal sulfide. $FeS_2$ and $FeF_3$ can also be used as cheap and electronically conductive active materials in a nonaqueous or aqueous lithium system.

In some embodiments the semi-solid flow battery is a lithium battery, and the negative electrode active compound comprises graphite, graphitic boron-carbon alloys, hard or disordered carbon, lithium titanate spinel, or a solid metal or metal alloy or metalloid or metalloid alloy that reacts with lithium to form intermetallic compounds, including the metals Sn, Bi, Zn, Ag, and Al, and the metalloids Si and Ge.

Exemplary electroactive materials for the negative electrode in the case of a lithium working ion include graphitic or non-graphitic carbon, amorphous carbon, or mesocarbon microbeads; an unlithiated metal or metal alloy, such as metals including one or more of Ag, Al, Au, B, Ga, Ge, In, Sb, Sn, Si, or Zn, or a lithiated metal or metal alloy including such compounds as LiAl, $Li_9Al_4$, $Li_3Al$, LiZn, LiAg, $Li_{10}Ag_3$, $Li_5B_4$, $Li_7B_6$, $Li_{12}Si_7$, $Li_{21}Si_8$, $Li_{13}Si_4$, $Li_{21}Si_5$, $Li_5Sn_2$, $Li_{13}Sn_5$, $Li_7Sn_2$, $Li_{22}Sn_5$, $Li_2Sb$, $Li_3Sb$, LiBi, or $Li_3Bi$, or amorphous metal alloys of lithiated or non-lithiated compositions.

The current collector can be electronically conductive and should be electrochemically inactive under the operation conditions of the cell. Typical current collectors for lithium cells include copper, aluminum, or titanium for the negative current collector and aluminum for the positive current collector, in the form of sheets or mesh, or any configuration for which the current collector may be distributed in the electrolyte and permit fluid flow. Selection of current collector materials is well-known to those skilled in the art. In some embodiments, aluminum is used as the current collector for positive electrode. In some embodiments, copper is used as the current collector for negative electrode. In other embodiments, aluminum is used as the current collector for negative electrode.

In some embodiments, the negative electrode can be a conventional stationary electrode, while the positive electrode includes a flowable redox composition. In other embodiments, the positive electrode can be a conventional stationary electrode, while the negative electrode includes a flowable redox composition.

Current collector materials can be selected to be stable at the operating potentials of the positive and negative electrodes of the flow battery. In nonaqueous lithium systems the positive current collector may comprise aluminum, or aluminum coated with conductive material that does not electrochemically dissolve at operating potentials of 2.5-5V with respect to $Li/Li^+$. Such materials include Pt, Au, Ni, conductive metal oxides such as vanadium oxide, and carbon. The negative current collector may comprise copper or other metals that do not form alloys or intermetallic compounds with lithium, carbon, and coatings comprising such materials on another conductor.

In some embodiments the redox-active compound is present as a nanoscale, nanoparticle, or nanostructured form. This can facilitate the formation of stable liquid suspensions of the storage compound, and improves the rate of reaction when such particles are in the vicinity of the current collector.

The nanoparticulates may have equiaxed shapes or have aspect ratios greater than about 3, including nanotubes, nanorods, nanowires, and nanoplatelets. Branched nanostructures such as nanotripods and nanotetrapods are also contemplated. Nanostructured ion storage compounds may be prepared by a variety of methods including mechanical grinding, chemical precipitation, vapor phase reaction, laser-assisted reactions, and bio-assembly. Bio-assembly methods include, for example, using viruses having DNA programmed to template an ion-storing inorganic compound of interest, as described in K. T. Nam, D. W. Kim, P. J. Yoo, C.-Y. Chiang, N. Meethong, P. T. Hammond, Y.-M. Chiang, A. M. Belcher, "Virus enabled synthesis and assembly of nanowires for lithium ion battery electrodes," *Science,* 312[5775], 885-888 (2006).

In redox cells with a semi-solid flowable redox composition, too fine a solid phase can inhibit the power and energy of the system by "clogging" the current collectors. In one or more embodiments, the semi-solid flowable composition contains very fine primary particle sizes for high redox rate, but which are aggregated into larger agglomerates. Thus in some embodiments, the particles of solid redox-active compound in the positive or negative flowable redox compositions are present in a porous aggregate of 1 micrometer to 500 micrometer average diameter.

In some embodiments, in order to increase the particle packing density and therefore the energy density of the semi-solid suspension, while still maintaining a flowable semi-solid, the ion storage compound particles have a polydisperse size distribution in which the finest particles present in at least 5 vol % of the total volume, is at least a factor of 5 smaller than the largest particles present in at least 5 vol % of the total volume.

In some embodiments, in order to increase the particle packing density and therefore the energy density of the semi-solid suspension, while still maintaining a flowable semi-solid, the ion storage compound particles have a bidisperse size distribution (i.e., with two maxima in the distribution of particle number versus particle size) in which the two maxima differ in size by at least a factor of 5.

In some embodiments, the sized distribution of ion storage compound particles in the semi-solid is polydisperse, and the particle packing fraction is at least 50 vol %, preferably at least 55 vol %, more preferably at least 60 vol %, still more preferably at least 65 vol %, and still more preferably at least 70 vol %. In one or more embodiments, the packing fraction is in the range of 50 vol % to 95 vol %.

In some embodiments, the particles have morphology that is at least equiaxed, and preferably spherical, in order to increase the flowability and decrease the viscosity of the semi-solid suspension while simultaneously achieving high particle packing density. In some embodiments, the particles have an oblate spheroid particle shape. In some embodiments the spherical particles are dense, and in other embodiments the spherical particles are porous. In some embodiments, the spherical particles are made by spray-drying a particle suspension to obtain spherical agglomerates of smaller particles.

Particles with very small particle size, e.g., on the order of less than 500 nm, can sometimes form low density continuous networks. Such networks demonstrate shear thinning behavior and high viscosity at low solids content. The increased viscosity complicates fluid flow and the low solids content reduces energy density. In some embodiments, the particles of ion storage material used in the semi-solid suspension are sufficiently large that surface forces do not prohibit them from achieving high tap density while dry, and high packing density when formulated into a semi-solid suspension. In some embodiments, the particle size is at least 1 micrometer and preferably at least 10 micrometers. Particles in this size range provide adequate flowability, yet are coarse enough that gravity, not surface energy, is the dominant force in particle packing.

Polydisperse size distribution of substantially equiaxed particles can provide a high packing density while maintaining flowability of the semisolid. Randomly packed monodispserse particles can become rigid at relatively low packing densities, e.g. at a particle packing fraction of about 58 vol %. To provide a semi-solid composition of higher solids content, the solids content of a large particles, e.g., particles whose packing is defined by gravity and not surface energy, is at a level at which the monodisperse particles are fluid or non-rigid. Additional particles of smaller particle size are introduced; such particles are of a size that can fit into interstitial spaces arising from packing of larger particles and are typically at least a factor of 5 smaller than the largest particles present. The smaller particles can occupy the interstitial spaces and therefore cannot form low density continuous networks. Thus, a high solids content of the semi-solid composition is attained, without undesirably increasing viscosity and impairing flow. Exemplary particle packing fractions can be about 75-85%.

The ion-permeable medium through which ions are transported within the redox flow energy storage device can include any suitable medium capable of allowing ions to be passed through it. In some embodiments, the ion-permeable medium can comprise a membrane. The membrane can be any conventional membrane that is capable of ion transport. In one or more embodiments, the membrane is a liquid-impermeable membrane that permits the transport of ions there through, namely a solid or gel ionic conductor. In other embodiments the membrane is a porous polymer membrane infused with a liquid electrolyte that allows for the shuttling of ions between the anode and cathode electroactive materials, while preventing the transfer of electrons. In some embodiments, the membrane is a microporous membrane that prevents particles forming the positive and negative electrode flowable compositions from crossing the membrane. Exemplary membrane materials include polyethyleneoxide (PEO) polymer in which a lithium salt is complexed to provide lithium conductivity, or Nafion™ membranes which are proton conductors. For example, PEO based electrolytes can be used as the membrane, which is pinhole-free and a solid ionic conductor, optionally stabilized with other membranes such as glass fiber separators as supporting layers. PEO can also be used as a slurry stabilizer, dispersant, etc. in the positive or negative flowable redox compositions. PEO is stable in contact with typical alkyl carbonate-based electrolytes. This can be especially useful in phosphate-based cell chemistries with cell potential at the positive electrode that is less than about 3.6 V with respect to Li metal. The operating temperature of the redox cell can be elevated as necessary to improve the ionic conductivity of the membrane.

In some embodiments, a carrier liquid is used to suspend and transport the solid phase or condensed liquid of the flowable redox composition. The carrier liquid can be any liquid that can suspend and transport the solid phase or condensed ion-storing liquid of the flowable redox composition. By way of example, the carrier liquid can be water, a polar solvent such as alcohols or aprotic organic solvents. Numerous organic solvents have been proposed as the components of Li-ion battery electrolytes, notably a family of cyclic carbonate esters such as ethylene carbonate, propylene carbonate, butylene carbonate, and their chlorinated or fluorinated derivatives, and a family of acyclic dialkyl carbonate esters, such as dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate and butylpropyl carbonate. Other solvents proposed as components of Li-ion battery electrolyte solutions include γ-butyrolactone, dimethoxyethane, tetrahydrofuran, 2-methyl tetrahydrofuran, 1,3-dioxolane, 4-methyl-1,3-dioxolane, diethyl ether, sulfolane, methylsulfolane, acetonitrile, propiononitrile, ethyl acetate, methyl propionate, ethyl propionate, dimethyl carbonate, tetraglyme, and the like. These nonaqueous solvents are typically used as multicomponent mixtures, into which a salt is dissolved to provide ionic conductivity. Exemplary salts to provide lithium conductivity include $LiClO_4$, $LiPF_6$, $LiBF_4$, LiTFSI, LiBETI, LiBOB, and the like.

In some embodiments, the viscosity of the redox compositions undergoing flow can be within a very broad range, from about 1 centipoise (cP) to about $1.5\times10^6$ cP or from about 1 centipoise (cP) to about $10^6$ cP at the operating temperature of the battery, which may be between about −50° C. and +500° C. In some embodiments, the viscosity of the electrode undergoing flow is less than about $10^5$ cP. In other embodiments, the viscosity is between about 100 cP and $10^5$ cP. In those embodiments where a semi-solid is used, the volume percentage of ion-storing solid phases may be between 5% and 70%, and the total solids percentage including other solid phases such as conductive additives may be between 10% and 75%. In some embodiments, the cell "stack" where electrochemical reaction occurs operates at a higher temperature to decrease viscosity or increase reaction rate, while the storage tanks for the semi-solid may be at a lower temperature.

In some embodiments, peristaltic pumps are used to introduce a solid-containing electroactive material into an electroactive zone, or multiple electroactive zones in parallel. The complete volume (occupied by the tubing, a slurry reservoir, and the active cells) of the slurry can be discharged and recharged by slurry cycling. The active positive electrode and negative electrode slurries can be independently cycled through the cell by means of peristaltic pumps. The pump can provide independent control of the flow rates of the positive electrode slurry and the negative electrode slurry. The independent control permits power balance to be adjusted to slurry conductivity and capacity properties.

In some embodiments, the peristaltic pump works by moving a roller along a length of flexible tubing. This way the fluid inside the tubing never comes into contact with anything outside of the tubing. In a pump, a drive turns a shaft which is coupled to a pump head. The pump head secures the tubing in place and also use the rotation of the shaft to move a rolling head across the tubing to create a flow within the tube. Such pumps are often used in situations where the fluid being transferred needs to be isolated (as in blood transfusions and other medical applications). Here the peristaltic pump can also be used to transfer viscous fluids and particle suspensions. In some embodiments, a closed circuit of tubing is used to run the slurry in a cycle, with power provided by the peristaltic pump. In some embodiments, the closed anolyte and catholyte systems may be connected to removable reservoirs to collect or supply anolyte and catholyte; thus enabling the active material to be recycled externally. The pump will require a source of power which may include that obtained from the cell. In some embodiments, the tubing may not be a closed cycle, in which case removable reservoirs for charged and of discharged anolytes and catholytes would be necessary; thus enabling the active material to be recycled externally. In some embodiments, one or more slurries are pumped through the redox cell at a rate permitting complete charge or discharge during the residence time of the slurry in the cell, whereas in other embodiments one or more slurries are circulated repeatedly through the redox cell at a higher rate, and only partially charged or discharged during the residence time in the cell. In some embodiments the pumping direction of one or more slurries is intermittently reversed to improve mixing of the slurries or to reduce clogging of passages in the flow system.

While peristaltic pumps have been described in detail, it should be understood that other types of pumps can also be used to transport the flowable redox composition(s) described herein. For example, in some embodiments, a piston pump is used to transport one or more flowable redox compositions through the redox flow energy storage device.

The flowable redox compositions can include various additives to improve the performance of the flowable redox cell. The liquid phase of the semi-solid slurry in such instances would comprise a solvent, in which is dissolved an electrolyte salt, and binders, thickeners, or other additives added to improve stability, reduce gas formation, improve SEI formation on the negative electrode particles, and the like. Examples of such additives include vinylene carbonate (VC), vinylethylene carbonate (VEC), fluoroethylene carbonate (FEC), or alkyl cinnamates, to provide a stable passivation layer on the anode or thin passivation layer on the oxide cathode; propane sultone (PS), propene sultone (PrS), or ethylene thiocarbonate as antigassing agents; biphenyl (BP), cyclohexylbenzene, or partially hydrogenated terphenyls, as gassing/safety/cathode polymerization agents; or lithium bis (oxatlato)borate as an anode passivation agent.

In some embodiments, the nonaqueous positive and negative electrode flowable redox compositions are prevented from absorbing impurity water and generating acid (such as HF in the case of $LiPF_6$ salt) by incorporating compounds that getter water into the active material suspension or into the storage tanks or other plumbing of the system. Optionally, the additives are basic oxides that neutralize the acid. Such compounds include but are not limited to silica gel, calcium sulfate (for example, the product known as Drierite), aluminum oxide and aluminum hydroxide.

In some embodiments, the colloid chemistry and rheology of the semi-solid flow electrode is adjusted to produce a stable suspension from which the solid particles settle only slowly or not at all, in order to improve flowability of the semi-solid and to minimize any stirring or agitation needed to avoid settling of the active material particles. The stability of the electroactive material particle suspension can be evaluated by monitoring a static slurry for evidence of solid-liquid separation due to particle settling. As used herein, an electroactive material particle suspension is referred to as "stable" when there is no observable particle settling in the suspension. In some embodiments, the electroactive material particle suspension is stable for at least 5 days. Usually, the stability of the electroactive material particle suspension increases with decreased suspended particle size. In some embodiments, the particle size of the electroactive material particle suspension is about less than 10 microns. In some embodiments, the particle size of the electroactive material particle suspension is about less than 5 microns. In some embodiments, the particle size of the electroactive material particle suspension is about 2.5 microns. In some embodiments, conductive additives are added to the electroactive material particle suspension to increase the conductivity of the suspension. Generally, higher volume fractions of conductive additives such as Ketjen carbon particles increase suspension stability and electronic conductivity, but excessive amount of conductive additives may also increase the viscosity of the suspension. In some embodiments, the flowable redox electrode composition includes thickeners or binders to reduce settling and improve suspension stability. In some embodiments, the shear flow produced by the pumps provides additional stabilization of the suspension. In some embodiments, the flow rate is adjusted to eliminate the formation of dendrites at the electrodes.

In some embodiments, the active material particles in the semi-solid are allowed to settle and are collected and stored separately, then re-mixed with the liquid to form the flow electrode as needed.

In some embodiments, the rate of charge or discharge of the redox flow battery is increased by increasing the instant amount of one or both flow electrodes in electronic communication with the current collector.

In some embodiments, this is accomplished by making the semi-solid suspension more electronically conductive, so that the reaction zone is increased and extends into the flow electrode. In some embodiments, the conductivity of the semi-solid suspension is increased by the addition of a conductive material, including but not limited to metals, metal carbides, metal nitrides, and forms of carbon including carbon black, graphitic carbon powder, carbon fibers, carbon microfibers, vapor-grown carbon fibers (VGCF), and fullerenes including "buckyballs", carbon nanotubes (CNTs), multiwall carbon nanotubes (MWNTs), single wall carbon nanotubes (SWNTs), graphene sheets or aggregates of graphene sheets, and materials comprising fullerenic fragments that are not predominantly a closed shell or tube of the graphene sheet. In some embodiments, nanorod or nanowire or highly expected particulates of active materials or conductive additives can be included in the electrode suspensions to improve ion storage capacity or power or both. As an example, carbon nanofilters such as VGCF (vapor growth carbon fibers), multiwall carbon nanotubes (MWNTs) or single-walled carbon nanotubes (SWNTs), may be used in the suspension to improve electronic conductivity, or optionally to store the working ion.

In some embodiments, the electrochemical function of a conventional aqueous or non-aqueous redox flow battery including those discussed in C. Ponce de Leon, A. Frias-Ferrer, J. Gonzalez-Garcia, D. A. Szantos and F. C. Walsh, "Redox Flow Batteries for Energy Conversion," J. Power Sources, 160, 716 (2006), M. Bartolozzi, "Development of Redox Flow Batteries: A Historical Bibliography," J. Power Sources, 27, 219 (1989), or M. Skyllas-Kazacos and F. Grossmith, "Efficient Vanadium Redox Flow Cell," Journal of the Electrochemical Society, 134, 2950 (1987), is improved by mixing or blending the catholyte or anolyte with particulates of an electronically conductive material, such as solid inorganic conductive materials including but not limited to metals, metal carbides, metal nitrides, metal oxides, and allotropes of carbon including carbon black, graphitic carbon, carbon fibers, carbon microfibers, vapor-grown carbon fibers (VGCF), fullerenic carbons including "buckyballs", carbon nanotubes (CNTs), multiwall carbon nanotubes (MWNTs), single wall carbon nanotubes (SWNTs), graphene sheets or aggregates of graphene sheets, and materials comprising fullerenic fragments. In some embodiments, such electronically insulating organic redox compounds are rendered electronically active by mixing or blending with an electronically conductive polymer, including but not limited to polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocence-substituted polyethylene, carbazole-substituted polyethylene, polyoxyphenazine, polyacenes, or poly(heteroacenes).). In some embodiments, the resulting catholyte or anolyte mixture has an electronic conductivity of at least $10^{-6}$ S/cm, preferably at least $10^{-5}$ S/cm, more preferably at least $10^{-4}$ S/cm, and still more preferably at least $10^{-3}$ S/cm.

In some embodiments, the conductivity of the semi-solid ion-storing material is increased by coating the solid of the semi-solid ion-storing material with a conductive coating material which has higher electron conductivity than the solid. Non-limiting examples of conductive-coating material include carbon, a metal, metal carbide, metal nitride, metal oxide, or conductive polymer. In some embodiments, the coating can be conducted in a fluidized bed by electroplating of active particles with a metal; other techniques such as decorating active material with Cu (or other metal) through sintering is also contemplated.

In some embodiments, the conductive polymer includes but is not limited to polyaniline or polyacetylene based conductive polymers or poly(3,4-ethylenedioxythiophene) (PEDOT), polypyrrole, polythiophene, poly(p-phenylene), poly (triphenylene), polyazulene, polyfluorene, polynaphtalene, polyanthracene, polyfuran, polycarbazole, tetrathiafulvalene-substituted polystyrene, ferrocence-substituted polyethylene, carbazole-substituted polyethylene, polyoxyphenazine, polyacenes, or poly(heteroacenes).). In some embodiments, the conductive polymer is a compound that reacts in-situ to form a conductive polymer on the surface of active materials particles. In one embodiment, the compound is 2-hexylthiophene or 3-hexylthiophene and oxidizes during charging of the battery to form a conductive polymer coating on solid particles in the cathode semi-solid suspension. In other embodiments, redox active material can be embedded in conductive matrix The redox active material can coat the exterior and interior interfaces in a flocculated or agglomerated particulate of conductive material. In other embodiments, the redox-active material and the conductive material can be two components of a composite particulate. Without being bound by any theory or mode of operation, such coatings can passivate the redox active particles and can help prevent undesirable reactions with carrier liquid or electrolyte. As such, it can serve as a synthetic solid-electrolyte interphase (SEI) layer.

In some embodiments, the solid of the semi-solid ion-storing material is coated with metal that is redox-inert at the operating conditions of the redox energy storage device. In some embodiments, the solid of the semi-solid ion-storing material is coated with copper to increase the conductivity of the storage material particle, to increase the net conductivity of the semi-solid, and/or to facilitate charge transfer between energy storage particles and conductive additives. In some embodiments, the storage material particle is coated with, about 1.5% by weight, metallic copper. In some embodiments, the storage material particle is coated with, about 3.0% by weight, metallic copper. In some embodiments, the storage material particle is coated with, about 8.5% by weight, metallic copper. In some embodiments, the storage material particle is coated with, about 10.0% by weight, metallic copper. In some embodiments, the storage material particle is coated with, about 15.0% by weight, metallic copper. In some embodiments, the storage material particle is coated with, about 20.0% by weight, metallic copper.

In general, the cycling performance of the flowable redox electrode increases with the increases of the weight percentages of the conductive coating material. In general, the capacity of the flowable redox electrode also increases with the increases of the weight percentages of the conductive coating material.

In some embodiments, the surface conductivity or charge-transfer resistance of current collectors used in the semi-solid flow battery is increased by coating the current collector surface with a conductive material. Such layers can also serve as a synthetic SEI layer. Non-limiting examples of conductive-coating material include carbon, a metal, metal carbide, metal nitride, metal oxide, or conductive polymer. In some embodiments, the conductive polymer includes but is not limited to polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocence-substituted polyethylene, carbazole-substituted polyethylene, polyoxyphenazine, polyacenes, or poly(heteroacenes). In some embodiments, the conductive polymer is a compound that reacts in-situ to form a conductive polymer on the surface of the current collector. In one embodiment, the compound is 2-hexylthiophene and oxidizes at a high potential to form a conductive polymer coating on the current collector. In some embodiments, the current collector is coated with metal that is redox-inert at the operating conditions of the redox energy storage device.

In some embodiments, a redox mediator is used to improve charge transfer within the semi-solid suspension. The redox mediator assists in the transfer of electrical current from the redox compound to the current collector. Redox mediators include soluble species having multiple oxidation states. In some embodiments the redox mediator is based on $Fe^{2+}$ or $V^{2+}$, $V^{3+}$, or $V^{4+}$. In one embodiment the redox mediator is ferrocene.

In one embodiment, the flow battery uses dissolved redox ions as in a conventional aqueous or nonaqueous flow battery, but the anolyte and/or catholyte has a increased solubility for such ions by using as the solvent an ionic liquid. In some embodiments, the redox chemistry is Fe—Cr, vanadium redox, or a zinc-halogen chemistry.

In some embodiments, the rate of charge or discharge of the redox flow battery is increased by adjusting the interparticle interactions or colloid chemistry of the semi-solid to increase particle contact and the formation of percolating networks of the ion-storage material particles. In some embodiments, the percolating networks are formed in the vicinity of the current collectors. In some embodiments, the semi-solid is shear-thinning so that it flows more easily where desired. In some embodiments, the semi-solid is shear thickening, for example so that it forms percolating networks at high shear rates such as those encountered in the vicinity of the current collector.

The energy density of nonaqueous batteries using the flowable electrode active materials according to one or more embodiments compares favorably to conventional redox anolyte and catholyte batteries. Redox anolytes and catholytes, for example those based on vanadium ions in solution, typically have a molar concentration of the vanadium ions of between 1 and 8 molar, the higher concentrations occurring when high acid concentrations are used. One may compare the energy density of a semi-solid slurry based on known lithium ion battery positive and negative electrode compounds to these values. The liquid phase of the semi-solid slurry in such instances would comprise a solvent, including but not limited to an alkyl carbonate or mixture of alkyl carbonates, in which is dissolved a lithium salt, including but not limited to $LiPF_6$, and binders, thickeners, or other additives added to improve stability, reduce gas formation, improve SEI formation on the negative electrode particles, and the like.

In a non-aqueous semi-solid redox flow cell, one useful positive electrode flowable redox composition is a suspension of lithium transition metal olivine particles in the liquid discussed above. Such olivines include $LiMPO_4$ where M comprises a first row transition metals, or solid solutions, doped or modified compositions, or nonstoichiometric or disordered forms of such olivines. Taking the compound $LiFePO_4$ for illustrative example, the density of olivine $LiFePO_4$ is 3.6 g/cm$^3$ and its formula weight is 157.77 g/mole. The concentration of Fe per liter of the solid olivine is therefore: (3.6/157.77)×1000 cm$^3$/liter=22.82 molar. Even if present in a suspension diluted substantially by liquid, the molar concentration far exceeds that of typical redox electrolytes. For example, a 50% solids slurry has 11.41M concentration, exceeding even highly concentrated vanadium flow battery electrolytes, and this is achieved without any acid additions.

In some embodiments, a positive electrode flowable redox composition in which the electrochemically active solid compound forming the particles is $LiCoO_2$, the density is 5.01 g/cm$^3$ and the formula weight is 97.874 g/mole. The concentration of Co per liter is: (5.01/97.874)×1000 cm$^3$/liter=51.19 molar. The energy density of such semi-solid slurries is clearly a factor of several higher than that possible with conventional liquid catholyte or anolyte solutions.

In some embodiments, a suspension of graphite in the liquid, which may serve as a negative electrode flowable redox composition, is used. In operation, graphite (or other hard and soft carbons) can intercalate lithium. In graphite the maximum concentration is about $LiC_6$. Since graphite has a density of about 2.2 g/cm$^3$, and the formula weight of $LiC_6$ is 102.94 g/mole, the concentration of Li per liter of $LiC_6$ is: (2.2/102.94)×1000=21.37 molar. This is again much higher than conventional redox flow battery anolytes.

Furthermore, the nonaqueous batteries can have cell working voltages that are more than twice as high as some aqueous batteries, where the voltage can be limited to 1.2-1.5V due to the limitation of water hydrolysis at higher voltage. By contrast, use of $LiFePO_4$ with graphite in a semi-solid redox flow cell provides 3.3V average voltage, and $LiCoO_2$ with graphite provides 3.7V average voltage. Since the energy of any battery is proportional to voltage, the batteries using solid suspension or condensed ion-supporting liquid redox flow compositions have a further improvement in energy over conventional solution-based redox flow cells.

Thus a non-aqueous semi-solid redox flow cell can provide the benefits of both redox flow batteries and conventional lithium ion batteries by providing for a higher cell voltage and for flow battery electrodes that are much more energy dense than redox flow batteries by not being limited to soluble metals, but rather, comprising a suspension of solid or liquid electrode-active materials, or in the case of dense liquid reactants such as liquid metals or other liquid compounds, the flow battery electrolyte may comprise a significant fraction or even a majority of the liquid reactant itself. Unlike a conventional primary or secondary battery, the total capacity or stored energy may be increased by simply increasing the size of the reservoirs holding the reactants, without increasing the amount of other components such as the separator, current collector foils, packaging, and the like. Unlike a fuel cell, such a semi-solid redox flow battery is rechargeable.

Amongst many applications, the semi-solid and condensed ion-supporting liquid redox flow batteries can be used to power a plug-in hybrid (PHEV) or all-electric vehicle (EV). Currently, for markets where the daily driving distance is long, such as the U.S. where the median daily driving distance is 33 miles, PHEVs are an attractive solution because with daily charging a battery that supplies 40 miles of electric range (PHEV40) is practical. For a car weighing about 3000 lb this requires a battery of approximately 15 kWh of energy and about 100 kW power, which is a battery of manageable size, weight, and cost.

However, an EV of the same size for the same driving pattern generally will require longer range, such as a 200 mile driving distance between recharges, or 75 kWh, in order to provide an adequate reserve of energy and security to the user. Higher specific energy batteries are needed to meet the size, weight and cost metrics that will enable widespread use of EVs. The semi-solid and condensed ion-supporting liquid redox flow batteries can enable practical low cost battery solutions for such applications. The theoretical energy density of the $LiCoO_2$/carbon couple is 380.4 Wh/kg. However, high power and high energy lithium ion batteries based on such chemistry provide only about 100-175 Wh/kg at the cell level, due to the dilution effects of inactive materials. Providing a 200 mile range, which is equivalent to providing 75 kWh of energy, requires 750-430 kg of current advanced lithium ion cells. Additional mass is also required for other components of the battery system such as packaging, cooling systems, the battery management system, and the like.

Considering the use of conventional lithium ion batteries in EVs, it is known that specific energy is more limiting than power. That is, a battery with sufficient energy for the desired driving range will typically have more than enough power. Thus the battery system includes wasted mass and volume that provides unneeded power. The semi-solid or condensed ion-supporting liquid redox flow battery can have a smaller power-generating portion (or stack) that is sized to provide the necessary power, while the remaining, larger fraction of the total mass can be devoted to the high energy density positive and negative electrode redox flow compositions and their storage system. The mass of the power-generating stack is determined by considering how much stack is needed to provide the approximately 100 kW needed to operate the car. Lithium ion batteries are currently available that have specific power of about 1000-4000 W/kg. The power generated per unit area of separator in such a battery and in the stacks of the flowable redox cell is similar. Therefore, to provide 100 kW of power, about 25-100 kg of stack is needed.

The remainder of the battery mass may come predominantly from the positive and negative electrode flowable redox compositions. As the theoretical energy density for the $LiCoO_2$/carbon couple is 380.4 Wh/kg, the total amount of active material required to provide 75 kWh of energy is only 197 kg. In flow batteries the active material is by far the largest mass fraction of the positive and negative electrode flowable redox compositions, the remainder coming from additives and liquid electrolyte phase, which has lower density than the ion storage compounds. The mass of the positive and negative electrode flowable redox compositions needed to supply the 75 kWh of energy is only about 200 kg.

Thus, including both the stack mass (25-100 kg) and the positive and negative electrode flowable redox composition mass (200 kg), a semi-solid redox flow battery to supply a 200 mile range may weigh 225 to 300 kg mass, much less than the mass (and volume) of advanced lithium ion batteries providing the same range. The specific energy of such a system is 75 kWh divided by the battery mass, or 333 to 250 Wh/kg, about twice that of current lithium cells. As the total energy of the system increases, the specific energy approaches the theoretical value of 380.4 Wh/kg since the stack mass is a diminishing fraction of the total. In this respect the rechargeable lithium flow battery has different scaling behavior than conventional lithium ion cells, where the energy density is less than 50% of the theoretical value regardless of system size, due to the need for a large percentage of inactive materials in order to have a functioning battery.

Thus in one set of embodiments, a rechargeable lithium ion flow battery is provided. In some embodiments, such a battery has a relatively high specific energy at a relatively small total energy for the system, for example a specific energy of more than about 150 Wh/kg at a total energy of less than about 50 kWh, or more than about 200 Wh/kg at total energy less than about 100 kWh, or more than about 250 Wh/kg at total energy less than about 300 kWh.

In another set of embodiments, a redox flow device uses one or more reference electrode during operation to determine the absolute potential at the positive and negative current collectors, the potentials being used in a feedback loop to determine the appropriate delivery rate of positive and negative electrode flowable redox compositions. For example, if the cathodic reaction is completing faster than the anodic reaction, the cell will be “cathode-starved” and greater polarization will occur at the positive electrode. In such an instance, detection of the cathode potential will indicate such a condition or impending condition, and the rate of delivery of positive electrode flowable redox composition can be increased. If the redox flow cell is being used at high power, and both cathode and anode reactions are completing and resulting in a fully discharged or charged state at the instant flow rates, this too can be detected using the current collector potentials, and the rates of both positive and negative electrode flowable redox compositions are increased so as to “match” the desired current rate of the cell.

More than one reference electrode may be used in order to determine the positional variation in utilization and completeness of electrochemical reaction within the flow battery. Consider for example a planar stack wherein the positive and negative electrode flowable redox compositions flow parallel to the separator and electrodes, entering the stack at one end and exiting at the other. Since the cathode-active and anode-active materials can begin to charge or discharge as soon as they are in electrical communication, the extent of reaction can differ at the entrance and the exit to the stack. By placing reference electrodes at more than one position within the stack and within the cell, the near-instantaneous state of the cell with respect to state of charge or discharge and local polarization can be determined. The operating efficiency, power and utilization of the cell can be optimized by taking into account the voltage inputs from the reference electrodes and altering operating parameters such as total or relative flow rate of catholyte and anolyte.

The reference electrodes may also be placed elsewhere within the flow device system. For example, having reference electrodes in the positive and negative electrode flowable redox composition storage tanks, or having a separate electrochemical cell within the storage tanks, the state of charge and discharge of the positive and negative electrode flowable redox compositions in the tank can be monitored. This also can be used as input to determine the flow rate of the semi-solid suspensions when operating the battery in order to provide necessary power and energy. The position of the reference electrode permits the determination of the local voltage in either the anolyte, catholyte, or separator. Multiple reference electrodes permit the spatial distribution of voltage to be determined. The operating conditions of the cells, which may include flow rates, can be adjusted to optimize power density via changes in the distribution of voltage.

In some embodiments, the semi-solid redox flow cell is a nonaqueous lithium rechargeable cell and uses as the reference electrode a lithium storage compound that is lithiated so as to produce a constant potential (constant lithium chemical potential) over a range of lithium concentrations. In some embodiments the lithium-active material in the reference electrode is lithium titanate spinel or lithium vanadium oxide or a lithium transition metal phosphate including but not limited to a lithium transition metal olivine of general formula $Li_xM_yPO_4$ where M comprises a first row transition metal. In some embodiments the compound is $LiFePO_4$ olivine or $LiMnPO_4$ olivine or mixtures or solid solutions of the two.

Example 1

Semi-Solid Lithium Redox Flow Battery

Figure 2:
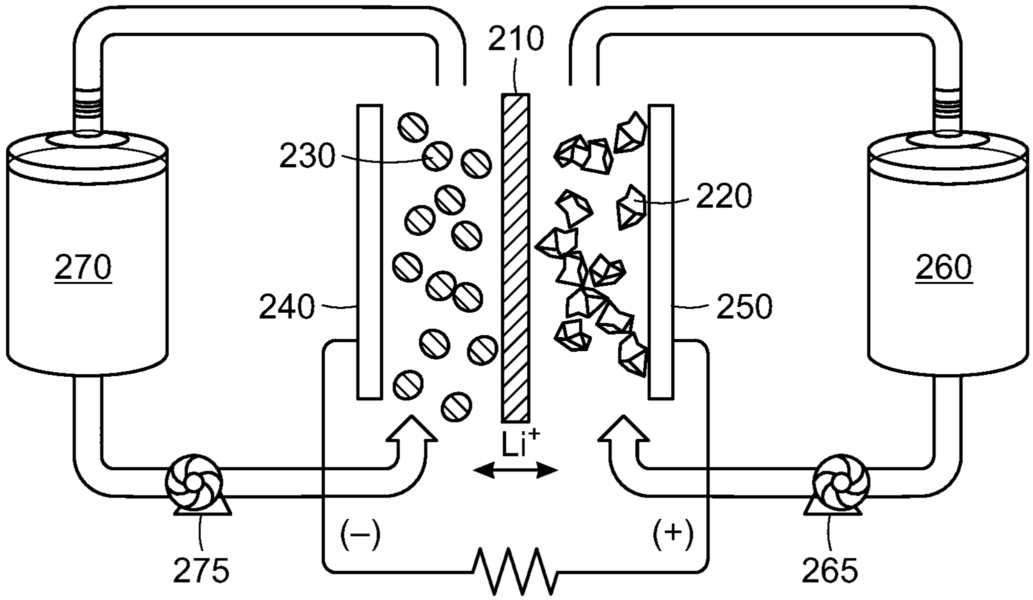
FIG. 2 is a schematic illustration of an exemplary redox flow cell for a lithium battery system.

An exemplary redox flow cell 200 for a lithium system is shown in FIG. 2. In this example, the membrane 210 is a microporous membrane such as a polymer separator film (e.g., Celgard™ 2400) that prevents cathode particles 220 and anode particles 230 from crossing the membrane, or is a solid nonporous film of a lithium ion conductor. The negative and positive electrode current collectors 240, 250 are made of copper and aluminum, respectively. The negative electrode composition includes a graphite or hard carbon suspension. The positive electrode composition includes $LiCoO_2$ or $LiFePO_4$ as the redox active component. Carbon particulates are optionally added to the cathode or anode suspensions to improve the electronic conductivity of the suspensions. The solvent in which the positive and negative active material particles are suspended is an alkyl carbonate mixture and includes a dissolved lithium salt such as $LiPF_6$. The positive electrode composition is stored in positive electrode storage tank 260, and is pumped into the electroactive zone using pump 265. The negative electrode composition is stored in negative electrode storage tank 270, and is pumped into the electroactive zone using pump 275. For the carbon and the $LiCoO_2$, the electrochemical reactions that occur in the cell are as follows:

$$\text{Charge: } x\text{Li}+6x\text{C}\rightarrow x\text{LiC}_6 \quad \text{LiCoO}_2\rightarrow x\text{Li}^+ + \text{Li}_{1-x}\text{CoO}_2$$

$$\text{Discharge: } x\text{LiC}_6\rightarrow x\text{Li}+6x\text{C} \quad x\text{Li}^+ + \text{Li}_{1-x}\text{CoO}_2\rightarrow \text{LiCoO}_2$$

Example 2

Semi-Solid Nickel Metal Hydride Redox Flow Battery

Figure 3:
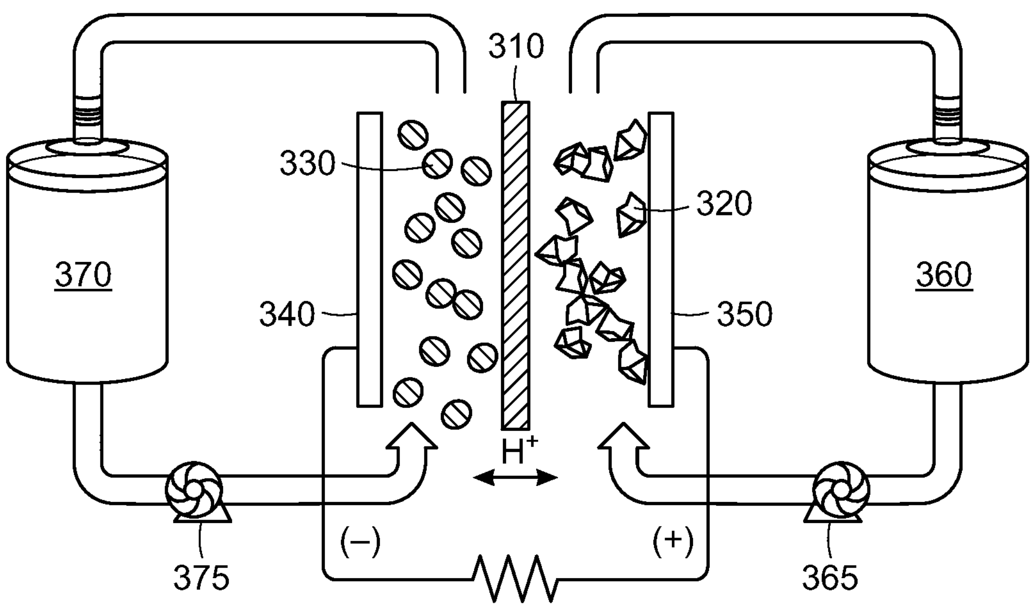
FIG. 3 is a schematic illustration of an exemplary redox flow cell for a nickel battery system.

An exemplary redox flow cell for a nickel system is shown in FIG. 3. In this example, the membrane 310 is a microporous electrolyte-permeable membrane that prevents cathode particles 320 and anode particles 330 from crossing the membrane, or is a solid nonporous film of a proton ion conductor, such as Nafion. The negative and positive electrode current collectors 340, 350 are both made of carbon. The negative electrode composition includes a suspension of a hydrogen absorbing metal, M. The positive electrode composition includes NiOOH as the redox active component. Carbon particulates are optionally added to the cathode or anode suspensions to improve the electronic conductivity of the suspensions. The solvent in which the positive and negative active material particles are suspended is an aqueous solution containing a hydroxyl generating salt such as KOH. The positive electrode composition is stored in positive electrode storage tank 360, and is pumped into the electroactive zone using pump 365. The negative electrode composition is stored in negative electrode storage tank 370, and is pumped into the electroactive zone using pump 375. The electrochemical reactions that occur in the cell upon discharge are as follows (the reactions upon charging being the reverse of these):

$$\text{Discharge: } xM+yH_2O+ye^- \rightarrow M_xH_y+yOH^- \; Ni(OH)_2+OH^- \rightarrow NiOOH+H_2O+e^-$$

Example 3

Reference Electrode Monitored Redox Flow Battery

Figure 4:
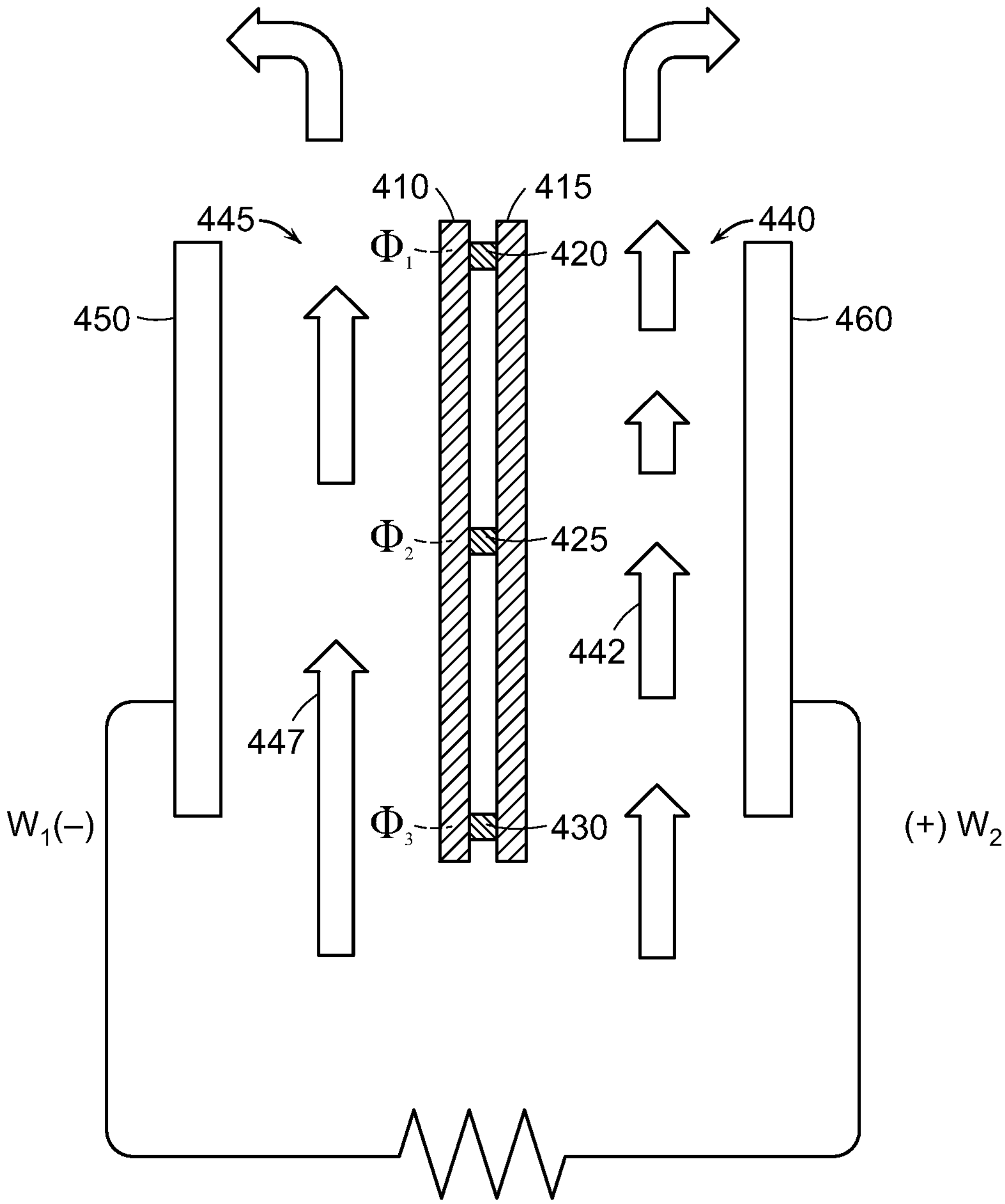
FIG. 4 is a schematic illustration of an exemplary redox flow battery using reference electrodes to monitor and optimize cell performance.

An exemplary redox flow battery using a reference electrode to optimize cell performance is shown in FIG. 4. The cell includes two membranes 410, 415. Reference electrodes 420, 425, 430 are positioned between the two membranes 410, 415 on a face opposite that of the electroactive zones 440, 445 where positive electrode redox flow composition 442 and negative electrode redox flow composition 447 flow, respectively. The cell also includes negative and positive current collectors 450, 460, respectively.

The potential at each reference electrode 420, 425 and 430 can be determined and are assigned a value of $\phi_1$, $\phi_2$ and $\phi_3$, respectively. The potentials at the working electrodes (current collectors) 450, 460 can also be determined and are assigned a value of $W_1$ and $W_2$, respectively. The potential differences of the cell components can be measured as follows:

$(W_1-W_2)$=cell voltage $(W_2-\phi_3)$=potential at cathode $(W_1-\phi_3)$=potential at anode $(\phi_3-\phi_2)$ or $(\phi_2-\phi_1)$=extent of reaction as redox compositions flow along stack.

In this example, three reference electrodes are used within the power generating stack (electroactive zone) in order to determine whether the flow rates of the positive and negative electrode redox flow compositions are at a suitable rate to obtain a desired power. For example, if the flow rate is too slow during discharge, the positive and negative electrode redox flow compositions fully discharge as the enter the stack and over most of their residence time in the stack there is not a high chemical potential difference for lithium. A higher flow rate allows greater power to be obtained. However, if the flow rate is too high, the active materials may not be able to fully charge or discharge during their residence time in the stack. In this instance the flow rate of the slurries may be slowed to obtain greater discharge energy, or one or more slurries may be recirculated to obtain more complete discharge. In the instance of charging, too high a flow rate prevents the materials from fully charging during a single pass, and the stored energy is less than the system is capable of, in which case the slurry flow rate may be decreased, or recirculation used, to obtain more complete charging of the active materials available.

Example 4

Preparing Partially Delithiated, Jet-Milled Lithium Cobalt Oxide

Lithium cobalt oxide powder was jet-milled at 15,000 RPM to produce particles with an average diameter of 2.5 microns. A 20 g sample of jet-milled lithium cobalt oxide was chemically delithiated by reacting with 2.5 g of nitronium tetrafluoroborate in acetonitrile over 24 hours. The delithiated $Li_{1-x}CoO_2$, having also a higher electronic conductivity by virtue of being partially delithiated, is used as the active material in a cathode semi-solid suspension.

Example 5

Preparing a Copper Plated Graphite Powder

Figure 5:
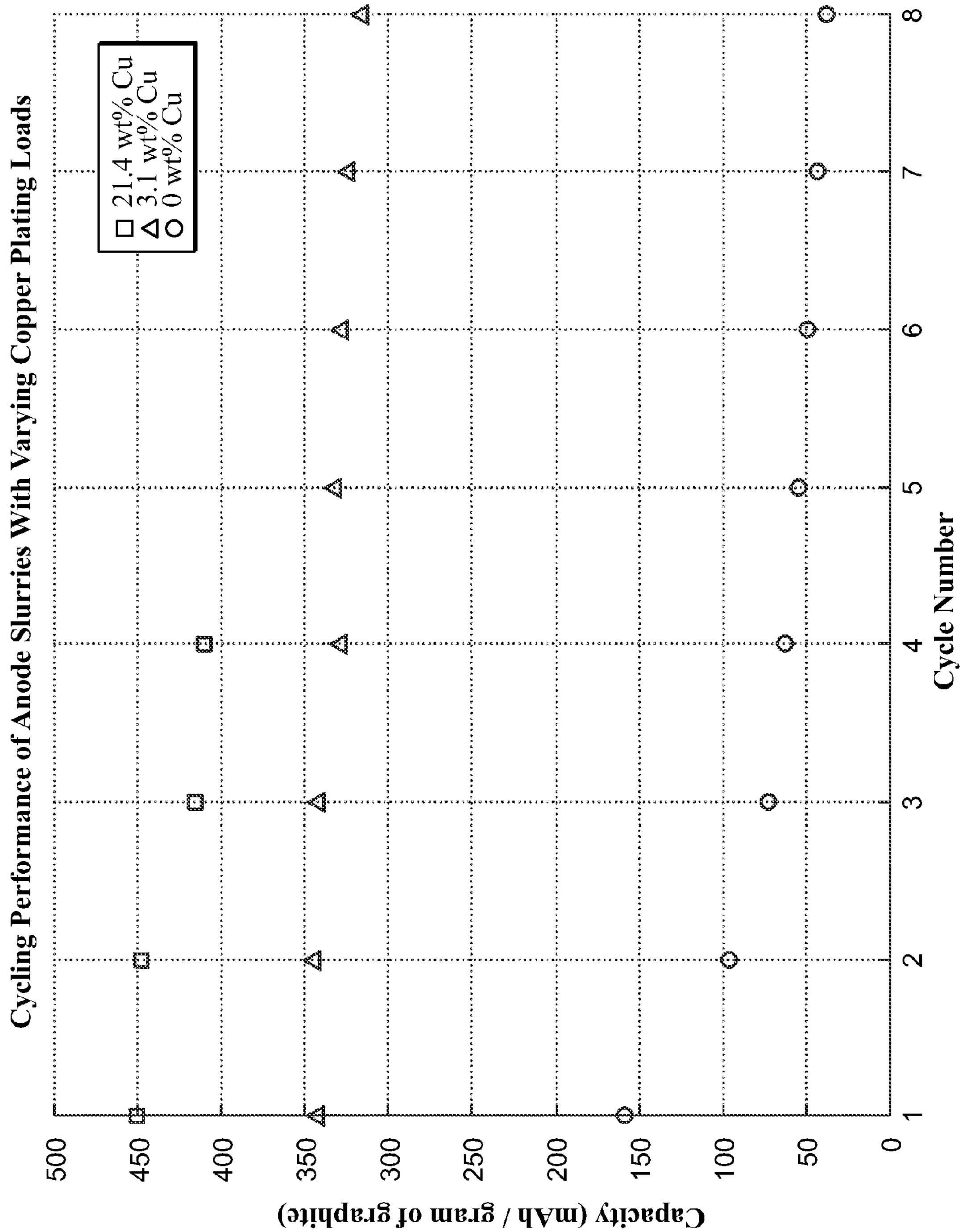
FIG. 5 illustrates cycling performance of anode slurries with varying copper plating load.

Commercial grade mesocarbon microbead (MCMB 6-28) graphitic anode powder was partially coated with, 3.1% by weight, metallic copper via an electroless plating reaction. MCMB (87.5 g) was stirred successively in the four aqueous solutions listed in Table 1. Between each step, the powder was collected by filtering and washed with reagent grade water. In the final solution, a concentrated solution of sodium hydroxide was added to maintain a pH of 12. Increasing the concentrations of the species in solution 4 would yield more copper rich powders. Powders with weight fractions 1.6%, 3.1%, 8.6%, 9.7%, 15%, and 21.4% copper were characterized by preparing slurries as described in Example 7, and testing the slurries as described in Example 8. The cycling performance increased and capacity increased with copper plating weight percents as illustrated in FIG. 5.

TABLE 1

Four aqueous solutions used to treat MCMB.

| Solution | Chemical | Concentration (M) |
|---|---|---|
| 1 (1 hr) | Nitric Acid | 4.0 |
| 2 (2 hr) | Stannous Chloride | 0.10 |
| | Hydrochloric Acid | 0.10 |
| 3 (2 hr) | Palladium Chloride | 0.0058 |
| | Hydrochloric Acid | 0.10 |
| 4 (0.5 hr) | Copper Sulfate | 0.020 |
| | EDTA | 0.050 |
| | Formaldehyde | 0.10 |
| | Sodium Sulfate | 0.075 |
| | Sodium Formate | 0.15 |
| | Polyethylene Glycol | 0.03 |
| | Sodium Hydroxide | Maintain at pH 12 |

Example 6

Preparing a Cathode Slurry

A suspension containing 25% volume fraction of delithiated, jet-milled lithium cobalt oxide, 0.8% volume fraction of Ketjen Black, and 74.2% volume fraction of a standard lithium ion battery electrolyte was synthesized. A stable cathode suspension was prepared by mixing 8.9 g of delithiated, jet-milled lithium cobalt oxide with 0.116 g of Ketjen Black carbon filler. The mixed powder was suspended in 5 mL of electrolyte and the suspension was sonicated for 20 minutes. Such a suspension was stable (i.e., there was no observable particle settling) for at least 5 days. The conductivity of such a suspension was measured to be 0.022 S/cm in an AC impedance spectroscopy measurement. Such slurries were tested in static and flowing cells as described in later Examples. Experimentation with the relative proportions of the constituents of the slurries showed that higher volume fractions of lithium cobalt oxide, which increase the storage capacity of the suspension, can be made. Increasing the volume fraction of solids in the suspension also increased the viscosity of the semi-solid suspensions. Higher volume fractions of Ketjen carbon particles increased suspension stability and electronic conductivity, but also the slurry viscosity. Straightforward experimentation was used to determine volume fractions of lithium cobalt oxide and Ketjen carbon that produce slurries of suitable viscosity for device operation.

Example 7

Preparing an Anode Slurry

A suspension containing 40% volume fraction of graphite in 60% volume fraction of a standard lithium ion battery electrolyte was synthesized by mixing 2.88 g of copper plated graphite (3.1 wt % copper) with 2.0 mL of electrolyte. The mixture was sonicated for 20 minutes. The conductivity of the slurry was 0.025 S/cm. Higher copper loadings on the graphite was observed to increase the slurries' viscosity.

Example 8

Static Half Cell Tests on Cathode and Anode Slurries

Figure 6:
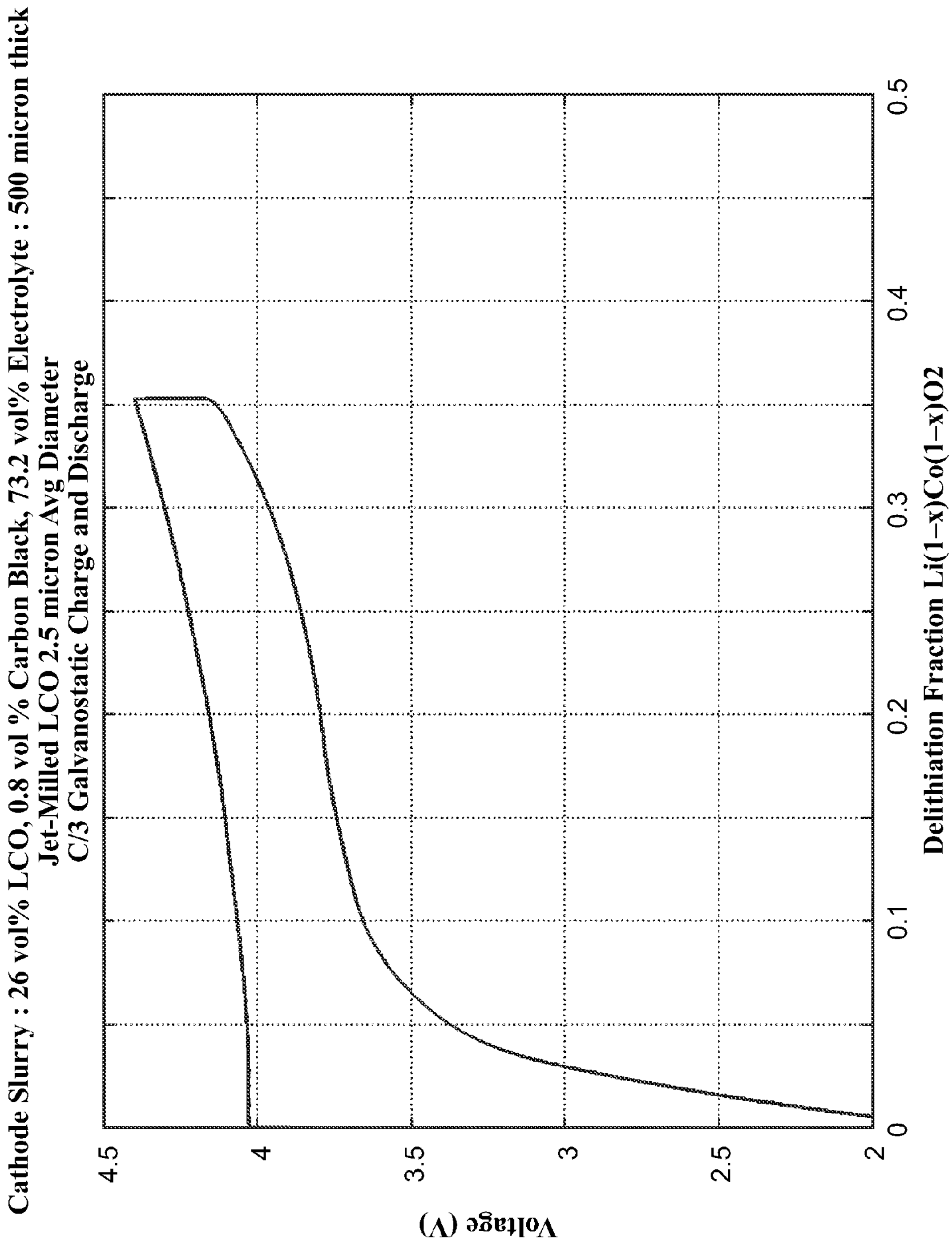
FIG. 6 illustrates a representative plot of voltage as a function of charging capacity for the cathode slurry half-cell.
Figure 7:
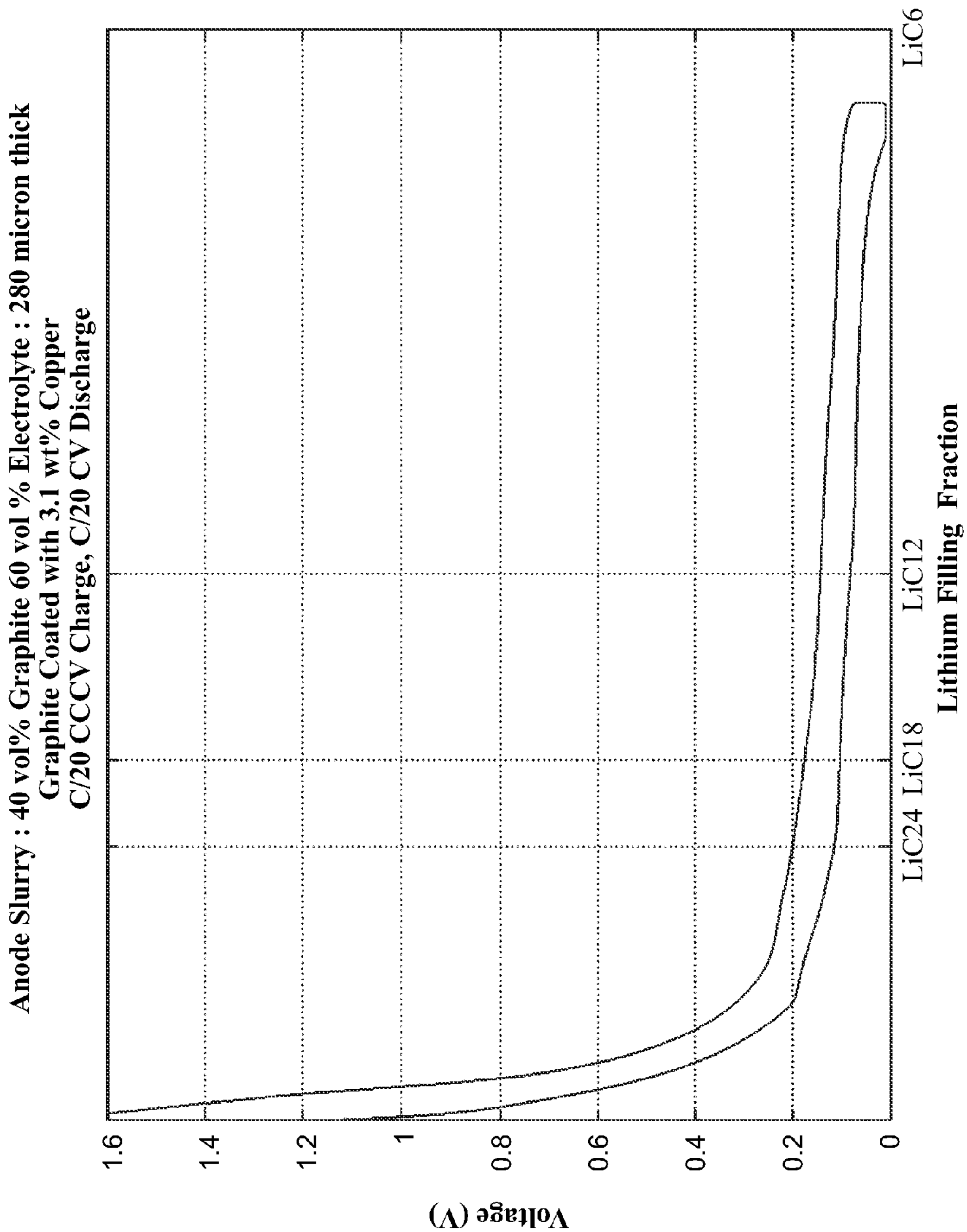
FIG. 7 illustrates a representative plot of voltage as a function of charging capacity for the anode slurry half-cell.
Figure 9:
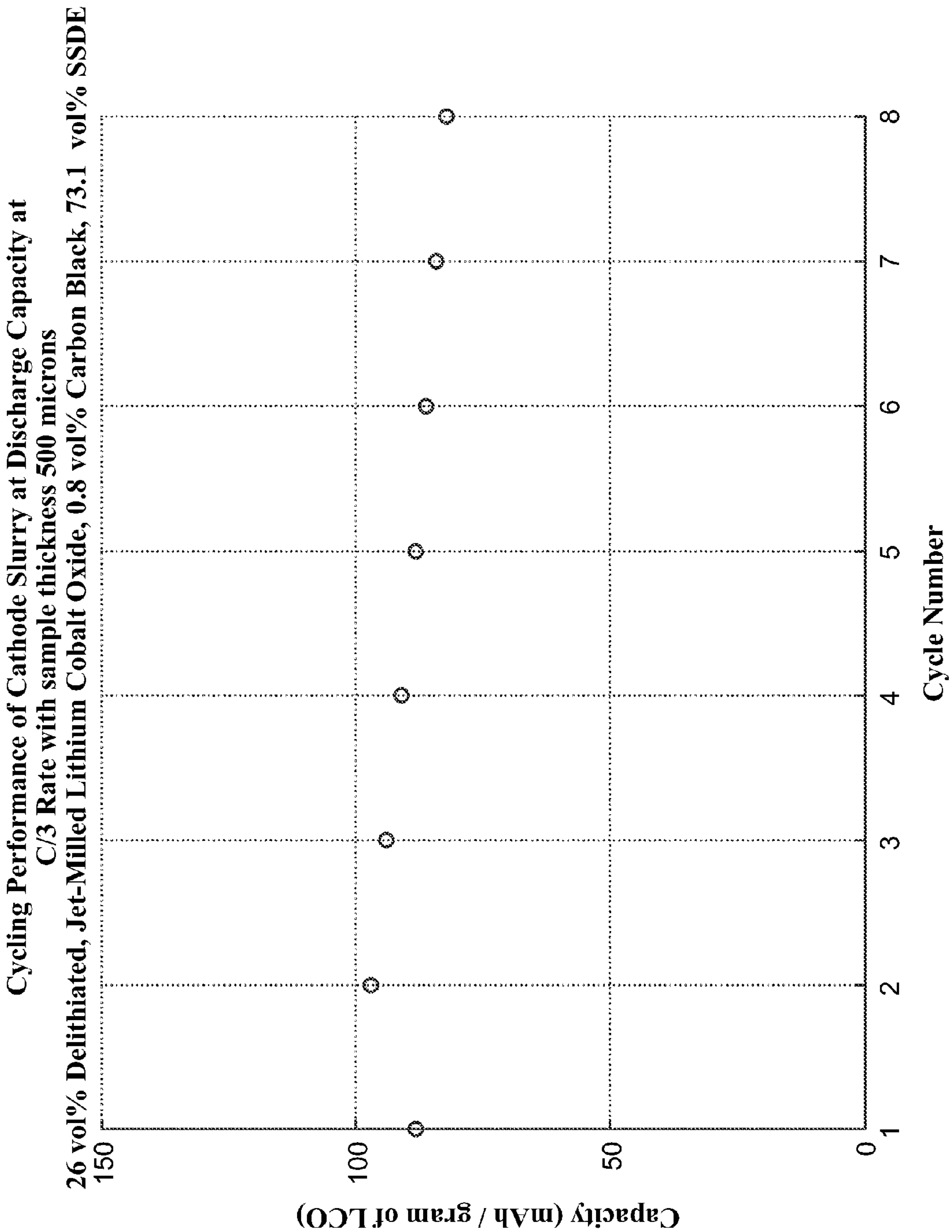
FIG. 9 illustrates a representative plot of the cathode discharge capacity vs. cycle number.

Semi-solid suspension samples, as described in Examples 6 and 7, were charged and discharged electrochemically against a lithium metal electrode in an electrochemical cell where the suspension was static. The cathode or anode slurry was placed in a metallic well which also acted as the current collector. The well and current collectors were machined from aluminum and copper for the cathode and anode, respectively. The wells holding the slurries had cylindrical shape 6.3 mm in diameter and depths ranging from 250-800 μm. A Celgard 2500 separator film separated the slurry from a lithium metal counter electrode, and an excess of electrolyte was added to the gaps in the cell to ensure that the electrochemically tested materials remained wetted with electrolyte. Testing was conducted in an argon-filled glovebox. A representative plot of voltage as a function of charging capacity for the cathode slurry half-cell is shown in FIG. 6. A representative plot of the cathode discharge capacity vs. cycle number is shown in FIG. 9. A representative plot of voltage as a function of charging capacity for the anode slurry half-cell is shown in FIG. 7. Both anode and cathode behaved electrochemically in a manner similar to their solid (unsuspended) counterparts. Example capacity measurements are shown in Table 2.

TABLE 2

Example capacity measurements.

| Slurry Material | Specific Capacity in mAh per gram of MCMB or $LiCoO_2$ | Specific Capacity in mAh per gram of Slurry | Volumetric Capacity in mAh per mL of Slurry |
|---|---|---|---|
| MCMB with 0 wt % deposited Cu, [1]40 vol % anode powder in electrolyte | 96 | 51 | 85 |
| MCMB with 3.1 wt % Cu, [2]40 vol % anode powder in electrolyte | 344 | 179 | 300 |
| MCMB with 15 wt % Cu [1]40 vol % anode powder in electrolyte | 252 | 123 | 219 |
| MCMB with 21.4 wt % Cu, [3]40 vol % anode powder in electrolyte | 420 | 190 | 354 |
| 26 vol % $LiCoO_2$, 0.8 vol % Ketjen Carbon Black in electrolyte[4] | 97 | 56 | 127 |

[1]Capacity calculated from the 2$^{nd}$ cycle discharge in a C/20 galvanostatic cycling experiment between 0.01 V and 0.6 V versus Li metal;
[2]Capacity calculated from the 2$^{nd}$ cycle discharge in a C/20 CCCV charge, C/20 galvanostatic discharge cycling experiment between 0.01 V and 1.6 V versus Li metal;
[3]Capacity calculated from the 2$^{nd}$ cycle discharge in a C/20 galvanostatic cycling experiment between 0.01 V and 1.6 V versus Li metal;
[4]Capacity calculated from 2$^{nd}$ discharge in a C/3 galvanostatic cycling experiment between 4.4 V and 2 V.

Example 9

Figure 8:
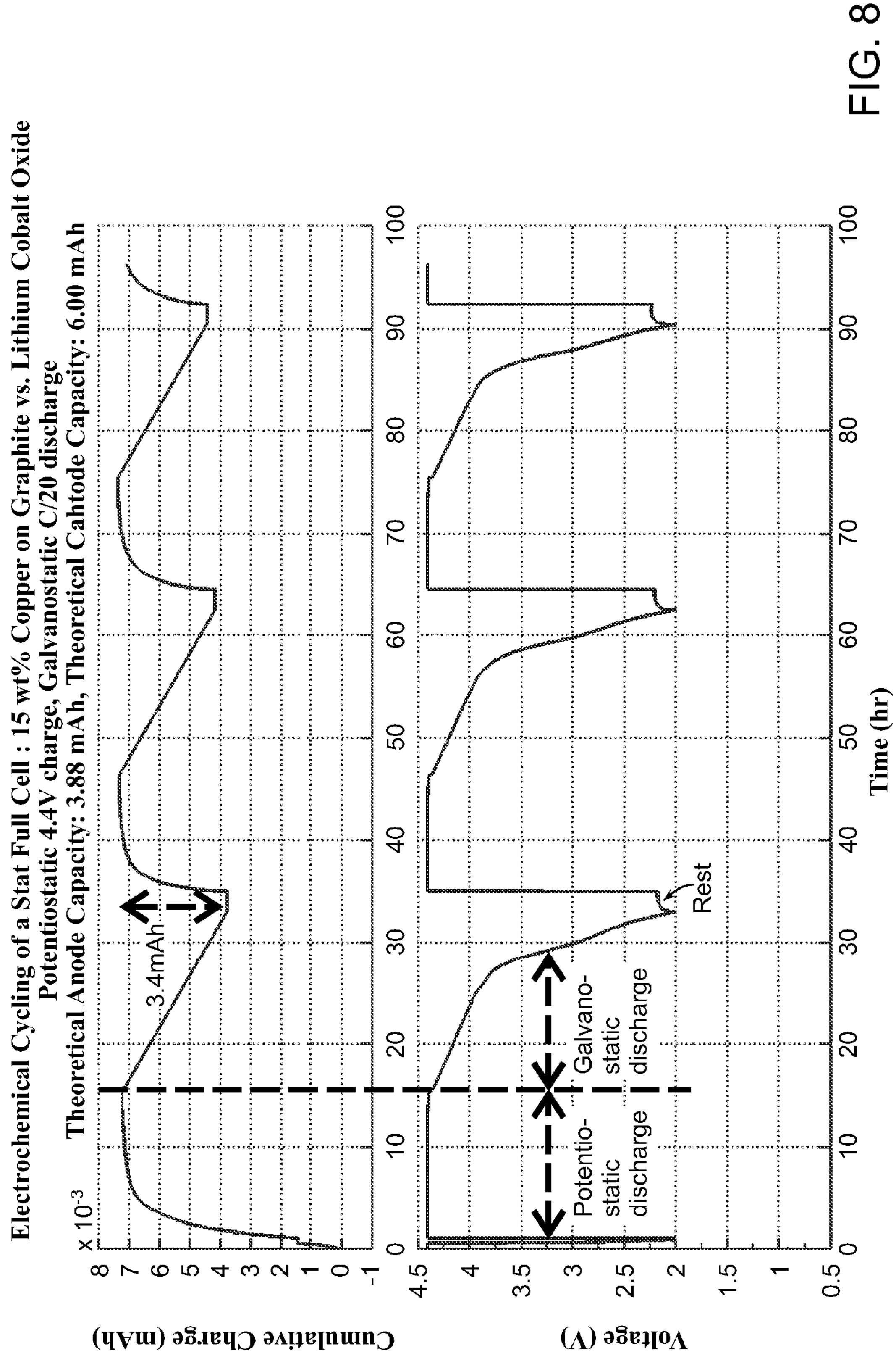
FIG. 8 illustrates a representative plot of voltage as a function of time (lower panel) and the corresponding charge or discharge capacity (upper panel) for a electrochemical cell with cathode and anode slurries.

Static Cell Tests of Full Lithium Ion Cell Using Cathode and Anode Semi-Solid Suspensions Cathode and anode slurries, as described in Examples 6 and 7, were charged and discharged electrochemically against each other in a static, electrochemical cell. The cathode and anode slurries were each placed in metallic wells/current collectors of the dimensions described in Example 8. The wells/current collectors were made of aluminum and copper for the cathode and anode, respectively. A Celgard 2500 film separated the two slurries in the cell. The cathode and anode suspensions were charged and discharged relative to each other repeatedly under potentiostatic and galvanostatic conditions, with galvanostatic testing being done at C-rates ranging from C/20 to C/10. A representative plot of voltage as a function of time is shown in the lower panel in FIG. 8. The corresponding charge or discharge capacity is shown in the upper panel in FIG. 8. In this test, the cell was charged under potentiostatic conditions, holding the cell voltage at 4.4V, while the charge capacity was monitored. The rate of charging is initially high, then diminishes. The cell was then galvanostatically discharged at a C/20 rate. The capacity obtained in the first discharge is ~3.4 mAh, which is 88% of the theoretical capacity of the anode in the cell. There is an excess of cathode in this cell which is therefore not fully utilized.

Example 10

Lithium Titanate Spinel Anode Suspension

Figure 10:
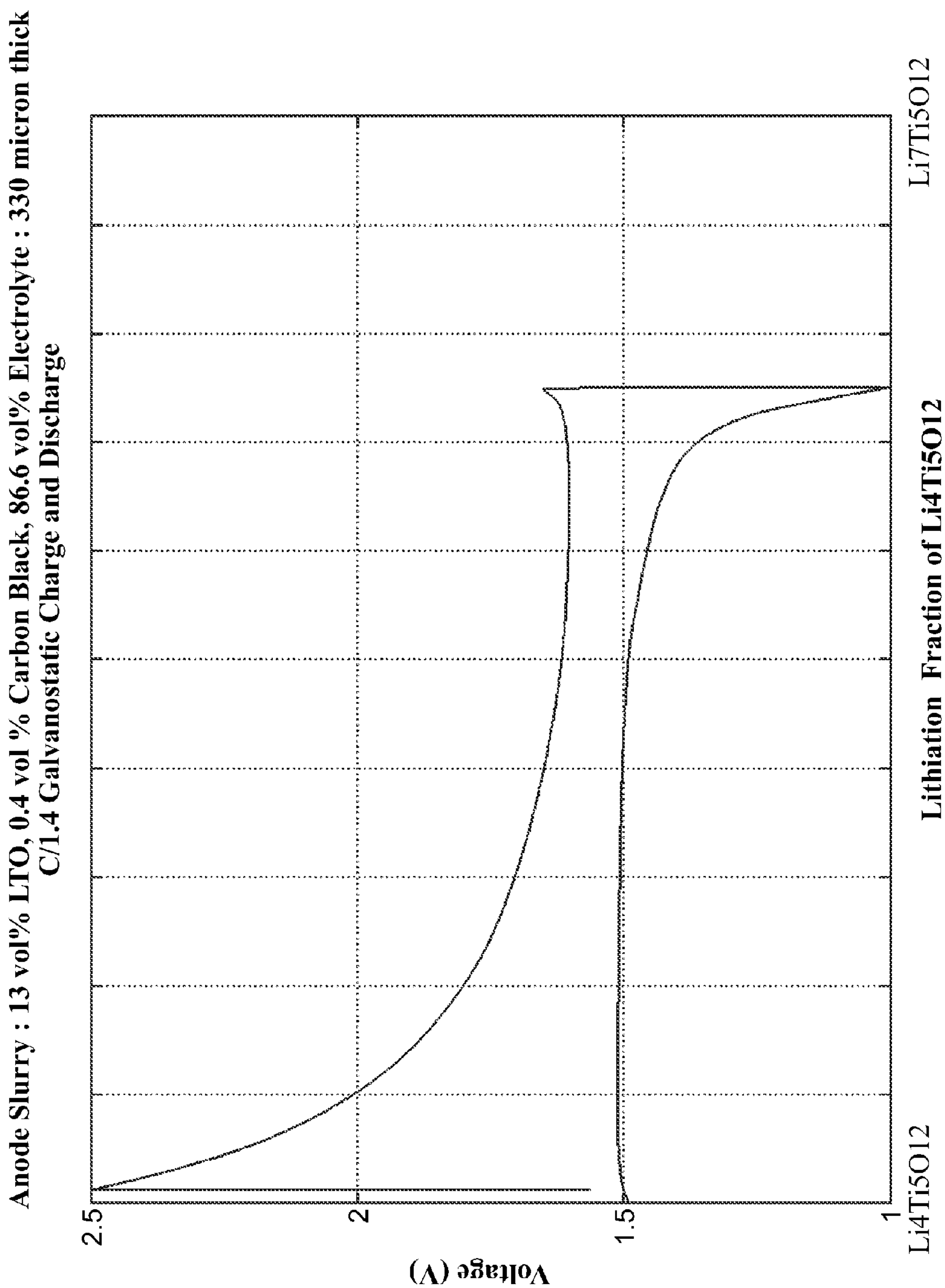
FIG. 10 illustrates the galvanostatic lithium insertion and extraction curves for the suspension at a relatively high C/1.4 rate.

Lithium titanate spinel, which may have a range of Li:Ti:O ratios and also may be doped with various metals or nonmetals, and of which a non-limiting composition is $Li_4Ti_5O_2$, intercalates lithium readily at a thermodynamic voltage near 1.5V with respect to $Li/Li^+$, and increases in its electronic conductivity as Li is inserted due to the reduction of $Ti^{4+}$ to $Ti^{3+}$. A 5 g sample of lithium titanate spinel powder is mixed with 100 mg of Ketjen Black and suspended in 10 mL of a standard lithium ion battery electrolyte, and the suspension is sonicated for 20 minutes. Such a suspension does not separate into components for at least 48 hours. This suspension was charged and discharged in a lithium half-cell as described in Example 8. FIG. 10 shows the galvanostatic lithium insertion and extraction curves for the suspension at a relatively high C/1.4 rate. During the lithium insertion step, the average voltage is very near the thermodynamic voltage of 1.55V, while upon extraction the average voltage is somewhat higher.

Example 11

Flowing Half Cell Tests on Cathode and Anode Slurries

Samples, as described in Examples 6 and 7, were charged and discharged electrochemically against a lithium metal electrode in a flowing, electrochemical cell. The cathode or anode slurry was pumped into a metallic channel of defined geometry, which acted as the current collector. The current collectors were aluminum and copper for the cathode and anode, respectively. Channels were 5 mm in diameter, 50 mm in length, and had a depth of 500 μm. A porous PVDF sheet (pore size: 250 μm), sandwiched between 2 Celgard 2500 separator films, added mechanical strength. In between the two separator films, separated from the slurries, was a lithium metal reference electrode attached to a copper wire and electrically isolated from both current collectors. An excess of liquid electrolyte was added to the gaps in the device to ensure that the electrochemically active components remained immersed in liquid electrolyte. Testing was conducted in an argon-filled glove box. The slurry in the channel was charged and discharged at rates ranging from C/20 to C/5. During charging, uncharged slurry was mechanically pumped into the test cell to replace that which had been fully charged in the channel. The charged slurry was pumped out of the cell and stored until the end of the charge. For discharging, the cell was run in reverse, both electrochemically and mechanically. New volume of slurry was pumped into the test cell as the volume in the cell was fully discharged. The volume of discharged suspension was pumped out of the cell and stored until the end of the discharge.

Example 12

Flowing Full Cell Tests on Cathode and Anode Slurries

Cathode and anode slurries, as described in Examples 3 and 4, were charged and discharged electrochemically in concert in a flowing, electrochemical cell. The cathode or anode slurry was pumped into a metallic channel, the channel material also acting as the current collector. The current collectors were aluminum and copper for the cathode and anode, respectively. Channels were 5 mm in diameter, 50 mm in length, and had a depth of 500 μm. A 250 μm perforated PVDF sheet, sandwich between 2 Celgard 2500 films, added mechanical strength and separated one slurry channel from the other. A piece of lithium foil attached to a copper wire was also sandwiched between the separator films and acted as a reference electrode. The slurries in the channel were charged and discharged at rates ranging from C/20 to C/5. Using peristaltic pumps, to which were attached elastomer tubing filled with cathode and anode slurries feeding the respective channels in the electrochemical cells, the slurries were pumped through the channels. During charging, uncharged slurry was mechanically pumped into the test cell to replace that which was fully charged. For discharging, the cell was run in reverse, both electrochemically and mechanically. The two slurries were flowed independent of one another and the state of charge of both anode and cathode slurries were monitored in real time using the lithium metal reference electrode. Several different modes of operation were used. In one instance, one or both slurries were intermittently pumped into the channels, the pumping stopped, and the slurries in the channel were charged or discharged, following which the slurry in the channel was displaced by fresh slurry and the process repeated. In another mode of operation, the slurries were pumped continuously, with the residence time of each slurry in its respective channel being sufficient for complete charge or discharge before exiting the channel. In yet another mode of operation, one or both slurries were pumped through their respective channels at a rate too high for complete charging or discharging during the residence time, but the slurry was continuously circulated so that over time, all of the slurry in the system was either charged or discharged. In yet another mode of operation, the pumping direction of one or both slurries was periodically reversed during a charging or discharging step, causing more slurry than the channel can accommodate at a given time to be charged or discharged.

It is recognized, of course, that those skilled in the art may make various modifications and additions to the processes of the invention without departing from the spirit and scope of the present contribution to the art. Accordingly, it is to be understood that the protection sought to be afforded hereby should be deemed to extend to the subject matter of the claims and all equivalents thereof fairly within the scope of the invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A flow cell energy storage system comprising:

a positive electrode current collector, a negative electrode current collector, and an ion-permeable membrane separating said positive and negative current collectors, positioned and arranged to define a positive electroactive zone and a negative electroactive zone;

wherein at least one of said positive and negative electroactive zone comprises a flowable semi-solid composition comprising ion storage compound particles capable of taking up or releasing said ions during operation of the cell, and wherein the ion storage compound particles have a polydisperse size distribution in which the finest particles present in at least 5 vol % of the total volume, is at least a factor of 5 smaller than the largest particles present in at least 5 vol % of the total volume.

2. The energy storage system of claim 1, wherein the finest particles present in at least 5 vol % of the total volume, is at least a factor of 7 smaller than the largest particles present in at least 5 vol % of the total volume.

3. The energy storage system of claim 1, wherein the finest particles present in at least 5 vol % of the total volume, is at least a factor of 10 smaller than the largest particles present in at least 5 vol % of the total volume.

4. The energy storage system of claim 1, wherein the ion storage compound particles have a bidisperse size distribution in which the two maxima differ in size by at least a factor of 5.

5. The energy storage system of claim 1, wherein the particle packing fraction is at least 50 vol %, preferably at least 55 vol %, more preferably at least 60 vol %, still more preferably at least 65 vol %, and still more preferably at least 70 vol %.

6. The energy storage system of claim 1, wherein the particles have morphology that is at least equiaxed.

7. The energy storage system of claim 2, the particle size of the maxima for the larger particles is at least 1 micrometer and preferably at least 10 micrometers.

8. The energy storage system of claim 1, further comprising a redox mediator.

9. The energy storage system of claim 8, wherein the redox mediator is soluble in the semi-solid composition and comprises multiple oxidation states.

10. The energy storage system of claim 8, wherein the redox mediator comprises a redox metal ion selected from iron, vanadium, chromium and zinc and mixtures thereof.

11. The energy storage system of claim 8, wherein the redox mediator comprises ferrocene.

12. The energy storage system of claim 1, wherein the semi-solid ion-storing redox composition further comprises an electronically conductive material.

13. The energy storage system of claim 12, wherein the electronically conductive material comprises a conductive inorganic compound.

14. The energy storage system of claim 12, wherein the electronically conductive material is selected from the group consisting of metals, metal carbides, metal nitrides, metal oxides, and allotropes of carbon including carbon black, graphitic carbon, carbon fibers, carbon microfibers, vapor-grown carbon fibers (VGCF), fullerenic carbons including "buckyballs", carbon nanotubes (CNTs), multiwall carbon nanotubes (MWNTs), single wall carbon nanotubes (SWNTs), graphene sheets or aggregates of graphene sheets, and materials comprising fullerenic fragments and mixtures thereof.

15. The energy storage system of claim 12, wherein the electronically conductive material comprises an electronically conductive polymer.

16. The energy storage system of claim 15, wherein the electronically conductive polymer is selected from the group consisting of polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocence-substituted polyethylene, carbazole-substituted polyethylene, polyoxyphenazine, polyacenes, or poly(heteroacenes) and mixtures thereof.

17. The energy storage system of claim 12, wherein the electronically conductive material coats the ion storage compound particles.

18. The energy storage system of claim 1, wherein the one or both of the positive and negative current collector is coated with an electronically conductive material.

19. The energy storage system of claim 17, wherein the conductive-coating material is selected from the group consisting of carbon, a metal, metal carbide, metal nitride, metal oxide, conductive polymers, polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocence-substituted polyethylene, carbazole-substituted polyethylene, polyoxyphenazine, polyacenes, or poly(heteroacenes) and mixtures thereof.

20. The energy storage system of claim 15, wherein the conductive polymer is a compound that reacts in-situ to form a conductive polymer on the surface of the current collector.

21. The energy storage system of claim 20, wherein the compound comprises 2-hexylthiophene and oxidizes at a high potential to form a conductive polymer coating on the current collector.

22. The energy storage system of claim 1, further comprising:

at least one storage tank external to the flow cell for holding, delivering and/or receiving the flowable semi-solid composition; and a cut-off valve for reversibly isolating the storage tank from the flow cell.

23. The energy storage system of claim 1, wherein one of said positive and negative electroactive zone comprises a flowable semi-solid composition comprising ion storage compound particles capable of taking up or releasing said ions during operation of the cell; and wherein one of said positive and negative electroactive zone comprises an aqueous redox solution capable of taking up or releasing said ions during operation of the cell and an electronically conductive material.

24. The energy storage system of claim 23, wherein the electronically conductive material is selected from the group consisting of polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocence-substituted polyethylene, carbazole-substituted polyethylene, polyoxyphenazine, polyacenes, or poly(heteroacenes) and mixtures thereof.

25. The energy storage system of claim 23, wherein the electronically conductive material is selected from the group consisting of solid inorganic conductive materials, metals, metal carbides, metal nitrides, metal oxides, and allotropes of carbon including carbon black, graphitic carbon, carbon fibers, carbon microfibers, vapor-grown carbon fibers (VGCF), fullerenic carbons including "buckyballs", carbon nanotubes (CNTs), multiwall carbon nanotubes (MWNTs), single wall carbon nanotubes (SWNTs), graphene sheets or aggregates of graphene sheets, and materials comprising fullerenic fragments and mixtures thereof.

26. The energy storage system of claim 1, wherein the particle packing fraction is at least 55 vol %.

27. The energy storage system of claim 1, wherein the particle packing fraction is at least 60 vol %.

28. The energy storage system of claim 1, wherein the particle packing fraction is at least, at least 70 vol %.

29. The energy storage system of claim 12, wherein the electronically conductive material forms a percolative conductive pathway.

30. The energy storage system of claim 23, wherein the electronically conductive material forms a percolative conductive pathway.

* * * * *